(12) United States Patent
Yamamoto et al.

(10) Patent No.: US 8,181,668 B2
(45) Date of Patent: May 22, 2012

(54) PRESSURE REDUCING VALVE FOR GAS

(75) Inventors: Hiroaki Yamamoto, Miyagi (JP); Yoji Nakajima, Miyagi (JP); Yoshio Saito, Miyagi (JP); Yutaka Chiba, Miyagi (JP)

(73) Assignee: Keihin Corporation, Tokyo (JP)

( * ) Notice: Subject to any disclaimer, the term of this patent is extended or adjusted under 35 U.S.C. 154(b) by 487 days.

(21) Appl. No.: 12/524,499

(22) PCT Filed: Jan. 22, 2008

(86) PCT No.: PCT/JP2008/050755
§ 371 (c)(1),
(2), (4) Date: Jul. 24, 2009

(87) PCT Pub. No.: WO2008/090861
PCT Pub. Date: Jul. 31, 2008

(65) Prior Publication Data
US 2009/0320935 A1    Dec. 31, 2009

(30) Foreign Application Priority Data

Jan. 25, 2007  (JP) .................................. 2007-015033

(51) Int. Cl.
*F16K 49/00* (2006.01)
*F16K 17/34* (2006.01)

(52) U.S. Cl. ..................... 137/340; 137/341; 137/484.8; 137/505.26; 137/505.41

(58) Field of Classification Search .................. 137/334, 137/340, 341, 484.4, 484.6, 484.8, 505.26, 137/505.36, 505.38, 505.39, 505.41
See application file for complete search history.

(56) References Cited

U.S. PATENT DOCUMENTS

| 3,319,829 | A  |   | 5/1967 | Sentz |
|---|---|---|---|---|
| 3,420,257 | A | * | 1/1969 | Lansky et al. ............... 137/484.6 |
| 5,285,810 | A | * | 2/1994 | Gotthelf ......................... 137/340 |
| 5,381,819 | A | * | 1/1995 | Gotthelf ......................... 137/340 |
| 5,443,083 | A | * | 8/1995 | Gotthelf ........................ 137/484.8 |
| 5,755,254 | A | * | 5/1998 | Carter et al. .............. 137/505.41 |
| 6,044,825 | A  |   | 4/2000 | Carter et al. |
| 7,021,329 | B2 | * | 4/2006 | Hyde et al. ..................... 137/341 |
| 7,341,073 | B2 | * | 3/2008 | Stradella et al. .......... 137/505.41 |
| 7,363,938 | B1 | * | 4/2008 | Newton .................... 137/505.41 |

FOREIGN PATENT DOCUMENTS

EP      0 678 798 A2   10/1995
(Continued)

*Primary Examiner* — Eric Keasel
(74) *Attorney, Agent, or Firm* — Arent Fox LLP

(57) ABSTRACT

A pressure reducing valve for gas is provided in which a valve mechanism having opening in a central part a valve hole that communicates with a low pressure passage and a low pressure chamber and including a valve body that is capable of being seated on a valve seat facing a valve chamber communicating with a high pressure passage is housed within a body such that the valve body is connected to a pressure receiving member operating in response to pressure of the low pressure passage and the low pressure chamber, wherein the body (16) is formed by joining a plurality of body members (18, 19) having different strengths, the entirety of the high pressure passage (30, 64) being formed, among the plurality of body members (18, 19), within the body member (18) that has a high strength, and at least part of the low pressure passage (85, 86, 94, 119) and the low pressure chamber (83, 84, 116) being formed, among the plurality of body members (18, 19), within the body member (19) that has a low strength. This enables the cost to be reduced.

8 Claims, 13 Drawing Sheets

FOREIGN PATENT DOCUMENTS

| | | |
|---|---|---|
| JP | 63-195174 U | 12/1988 |
| JP | 04-143403 A | 5/1992 |
| JP | 10-089532 A | 4/1998 |
| JP | 2002-180907 A | 6/2002 |
| JP | 3871065 B1 | 10/2006 |
| WO | WO 2006/067527 A1 | 6/2006 |

* cited by examiner

PRESSURE REDUCING VALVE FOR GAS

CROSS-REFERENCE TO RELATED APPLICATION

This application is a National Stage entry of International Application No. PCT/JP2008/050755, filed Jan. 22, 2008, which claims priority to Japanese Patent Application No. 2007-015033, filed Jan. 25, 2007, the disclosure of the prior applications is hereby incorporated in their entirety by reference.

TECHNICAL FIELD

The present invention relates to a pressure reducing valve for gas in which a valve mechanism having opening in a central part thereof a valve hole that communicates with a low pressure passage and a low pressure chamber and including a valve body that is capable of being seated on a valve seat facing a valve chamber communicating with a high pressure passage is housed within a body such that the valve body is connected to a pressure receiving member operating in response to pressure of the low pressure passage and the low pressure chamber.

BACKGROUND ART

Such a pressure reducing valve for gas is already known from, for example, Patent Publication 1.
Patent Publication 1: Japanese Patent Application Laid-open No. 2002-180907

DISCLOSURE OF INVENTION

Problems To Be Solved By the Invention

However, in an arrangement disclosed by Patent Publication 1 above, the body is formed from a single member; since it is necessary to form the entire body from a material that has a strength required for a portion where high pressure gas flows before its pressure is reduced, in a portion where relatively low pressure gas flows after its pressure is reduced the body has a greater strength than is required, and there is still room for reduction in cost.

The present invention has been accomplished in the light of such circumstances, and it is a first object thereof to provide a pressure reducing valve for gas that enables the cost to be reduced.

Furthermore, in the arrangement disclosed in Patent Publication 1 above, in order to prevent the temperature of the body from decreasing excessively accompanying the reduction in pressure, a hot water passage is formed from a recess provided in a side face of the body and a cover plate mounted on the body so as to close the recess, and engine cooling water is guided to the hot water passage, but the size of the body is increased in order to ensure the capacity of the passage and, moreover, the need for the cover plate results in an increase in the number of components.

The present invention has been accomplished in the light of such circumstances, and it is a second object thereof to provide a pressure reducing valve for gas that can prevent the temperature of the body from decreasing while avoiding any increase in the size of the body and any increase in the number of components.

Means for Solving the Problems

In order to attain the above first object, according to a first aspect of the present invention, there is provided a pressure reducing valve for gas in which a valve mechanism having opening in a central part thereof a valve hole that communicates with a low pressure passage and a low pressure chamber and comprising a valve body that is capable of being seated on a valve seat facing a valve chamber communicating with a high pressure passage is housed within a body such that the valve body is connected to a pressure receiving member operating in response to pressure of the low pressure passage and the low pressure chamber, characterized in that the body is formed by joining a plurality of body members having different strengths, the entirety of the high pressure passage being formed, among the plurality of body members, within the body member that has a high strength, and at least part of the low pressure passage and the low pressure chamber being formed, among the plurality of body members, within the body member that has low strength.

According to a second aspect of the present invention, in addition to the first aspect, the body is formed by joining the low strength second body member and the high strength first body member, which has an insertion hole coaxially housing the valve mechanism, so that the second body member and the first body member overlap each other in a direction along an axis of the valve body while forming therebetween a pressure reduction chamber, which is the low pressure chamber, and a circular cross-section fitting projection projectingly provided integrally with the first body member so as to be coaxial with the insertion hole is hermetically fitted into the second body member.

According to a third aspect of the present invention, in addition to the first and second aspect, a groove is provided in at least one of joining faces of the plurality of body members that are joined to each other to form the body, the groove forming between the body members that are joined to each other a housing chamber housing heating means or a heating medium passage through which a heating medium flows.

In order to attain the above second object, according to a fourth aspect of the present invention, there is provided a pressure reducing valve for gas in which a valve mechanism having opening in a central part thereof a valve hole that communicates with a low pressure passage and a low pressure chamber and comprising a valve body that is capable of being seated on a valve seat facing a valve chamber communicating with a high pressure passage is housed within a body such that the valve body is connected to a pressure receiving member operating in response to pressure of the low pressure passage and the low pressure chamber, characterized in that a groove is provided, among a plurality of body members forming the body, in at least one of joining faces of the body members that are joined to each other and have respectively the high pressure passage and at least part of the low pressure passage and the low pressure chamber, the groove forming between the body members in a state of being joined together a housing chamber for housing heating means or a heating medium passage through which a heating medium flows.

According to a fifth aspect of the present invention, in addition to the fourth aspect, a circular cross-section fitting projection projectingly provided integrally with the first body member so as to be coaxial with the valve body is hermetically fitted into the second body member, which is joined to the first body member so as to form the heating medium passage or the housing chamber between the second body member and the first body member.

According to a sixth aspect of the present invention, in addition to the fourth aspect, the heating medium passage or the housing chamber is formed in an arc shape surrounding the valve body and the valve seat when viewed in a direction along an axis of the valve body.

According to a seventh aspect of the present invention, in addition to the fourth or sixth aspect, the heating medium passage or the housing chamber is disposed at substantially the same position as the valve seat in a direction along an axis of the valve body.

According to an eighth aspect of the present invention, in addition to the fourth aspect, the body member having the groove formed therein is molded, and the groove is formed at the same time as the molding.

According to a ninth aspect of the present invention, in addition to the fourth aspect, a heating medium that is guided to the heating medium passage is engine cooling water.

According to a tenth aspect of the present invention, in addition to the fourth aspect, the heating means is an electric heater.

A diaphragm 115 of embodiments corresponds to the pressure receiving member of the present invention.

Effective of the Invention

In accordance with the first to third aspects of the present invention, since the body is formed from a plurality of body members having different strengths such that at least part of the low pressure passage and the low pressure chamber is formed from the body member having a low strength, it is possible to reduce the cost by not forming the entire body from a material having a higher strength than required.

Furthermore, in accordance with the second aspect of the present invention, since the body is formed by joining the high strength first body member and the low strength second body member, it is possible to further reduce the cost by employing neither too much nor too little of a portion formed from a high strength material for a portion on which high pressure gas acts so that the proportion of the low strength second body member occupying the overall body is increased. Moreover, since the fitting projection, which is projectingly provided integrally with the first body member coaxially with the insertion hole, which coaxially houses the valve mechanism, is hermetically fitted into the second body member, it is possible to easily obtain concentricity for the first and second body members.

Moreover, in accordance with the third aspect of the present invention, since the housing chamber housing heating means or the heating medium passage through which the heating medium flows is formed between joining faces of body members that are joined to each other, it is possible to avoid an increase in the overall size of the body due to the formation of the heating medium passage or the housing chamber, it is unnecessary to form a heating medium passage or a housing chamber using another component, thus preventing any increase in the number of components, and it is possible to prevent the temperature of the body from decreasing.

In accordance with the fourth aspect of the present invention, since the housing chamber housing heating means or the heating medium passage through which the heating medium flows is formed between joining faces of the body members, it is possible to avoid an increase in the overall size of the body due to the formation of the heating medium passage or the housing chamber, it is unnecessary to form a heating medium passage or a housing chamber using another component, thus preventing any increase in the number of components, and it is possible to prevent the temperature of the body from decreasing.

Furthermore, in accordance with the fifth aspect of the present invention, since the fitting projection, which is projectingly provided integrally with the first body member coaxially with the valve body is hermetically fitted into the second body member, it is possible to easily obtain concentricity for the first and second body members.

In accordance with the sixth aspect of the present invention, since the heating medium passage or the housing chamber is disposed so as to surround the valve body and the valve seat, it is possible to heat effectively the surroundings of the valve seat and the valve body, whose temperatures easily decrease during the pressure reduction action accompanying operation of the valve mechanism and, moreover, due to the heating medium passage or the housing chamber having an arc shape the surroundings of the valve seat and the valve body can be substantially evenly heated.

In accordance with the seventh aspect of the present invention, it is possible to heat more effectively the surroundings of the valve seat and the valve body, whose temperatures easily decrease during the pressure reduction action accompanying operation of the valve mechanism.

In accordance with the eighth aspect of the present invention, it is unnecessary to carry out machining for forming the groove, thus reducing the cost.

In accordance with the ninth aspect of the present invention, it is possible to heat the body by utilizing engine cooling water effectively.

Moreover, in accordance with tenth aspect of the present invention, it is possible to freely heat the body by the electric heater.

EXPLANATION OF REFERENCE NUMERALS AND SYMBOLS

Figure 1:
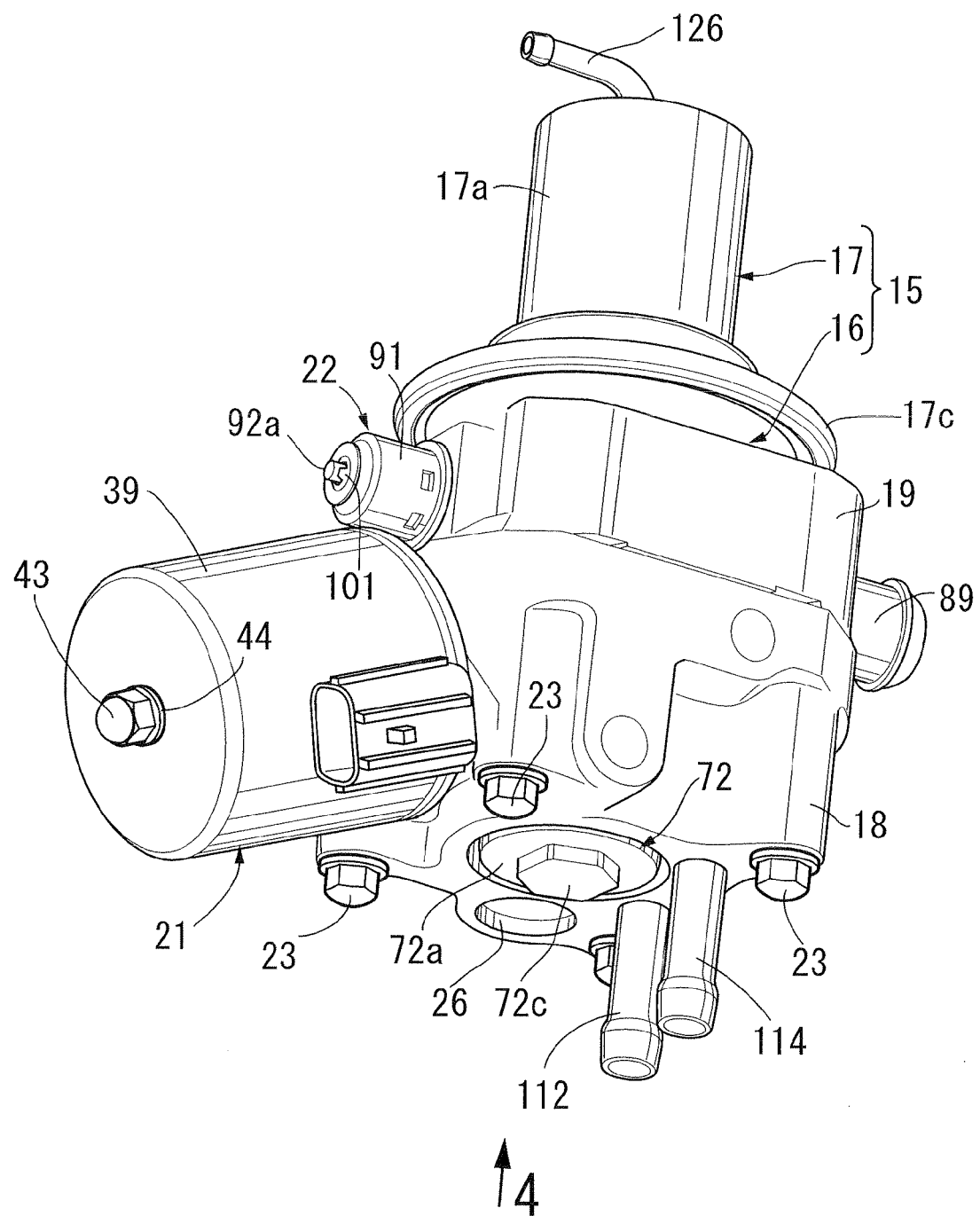
FIG. 1 is an overall perspective view of a pressure reducing valve for gas of a first embodiment. (first embodiment)

16, 16' Body
18, 18', 19, 19' Body member

18a Fitting projection
20 Valve mechanism
25 Insertion hole
27, 28, 30, 64 High-pressure passage
58 Valve seat
59 Valve body
66 Valve chamber
68 Valve hole
83 Pressure reduction chamber, which is a low pressure chamber
84 Back pressure chamber, which is a low pressure chamber
85 Small diameter communication passage, which is a low pressure passage
86 Outlet passage, which is a low pressure passage
94 Valve hole, which is a low pressure passage
109 Heating medium passage
110, 133, 134 Groove
115 Diaphragm, which is a pressure receiving member
116 Pressure action chamber, which is a low pressure chamber
119 Communication passage, which is a low pressure passage
131 Electric heater, which is heating means
132 Housing chamber

BEST MODE FOR CARRYING OUT THE INVENTION

Modes for carrying out the present invention are explained below by reference to embodiments of the present invention shown in the attached drawings.

Embodiment 1

FIG. 1 to FIG. 11 show a first embodiment of the present invention.

First, in FIG. 1, this pressure reducing valve for gas is for reducing the pressure of compressed natural gas, which is a gaseous fuel, and supplying it to an engine (not illustrated), and a housing 15 thereof is formed from a body 16 formed by joining first and second body members 18 and 19 to each other, and a diaphragm cover 17 joined to the body 16, the body 16 housing a valve mechanism 20 (see FIG. 2), and an electromagnetic cut-off valve 21 and a relief valve 22 being disposed in the body 16.

Figure 2:
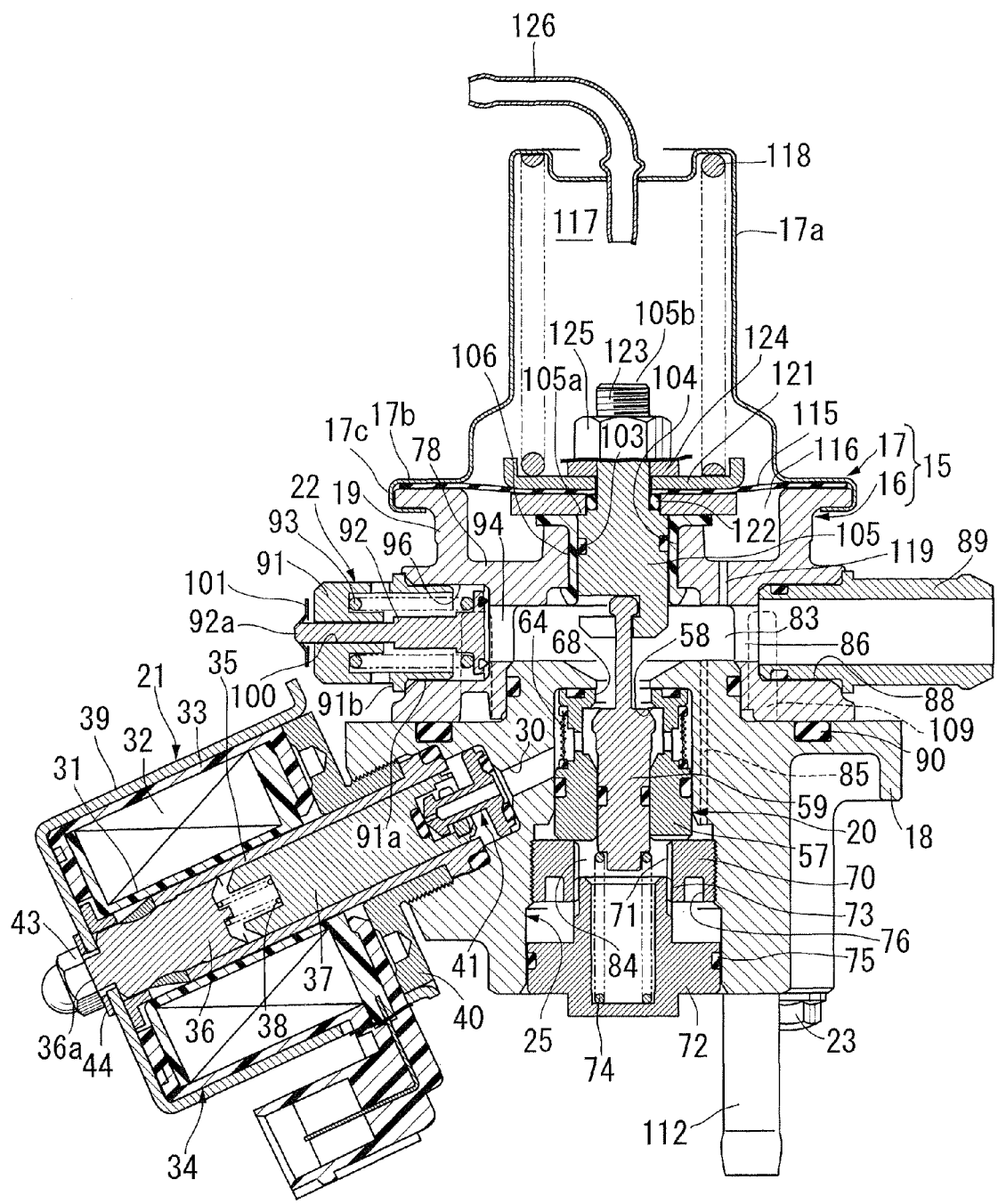
FIG. 2 is a vertical sectional view of the pressure reducing valve for gas. (first embodiment)

In FIG. 2, the body 16 is formed by joining to each other a plurality of body members having different strengths from each other, in this embodiment the first body member 18, which has a high strength, and the second body member 19, which has a low strength, while vertically stacked by means of, for example, four bolts 23, the first body member 18 being formed by, for example, cutting a drawn aluminum alloy or by cutting details after forging an aluminum alloy, and the second body member 19 being formed by, for example, cutting details after casting an aluminum alloy.

Figure 3:
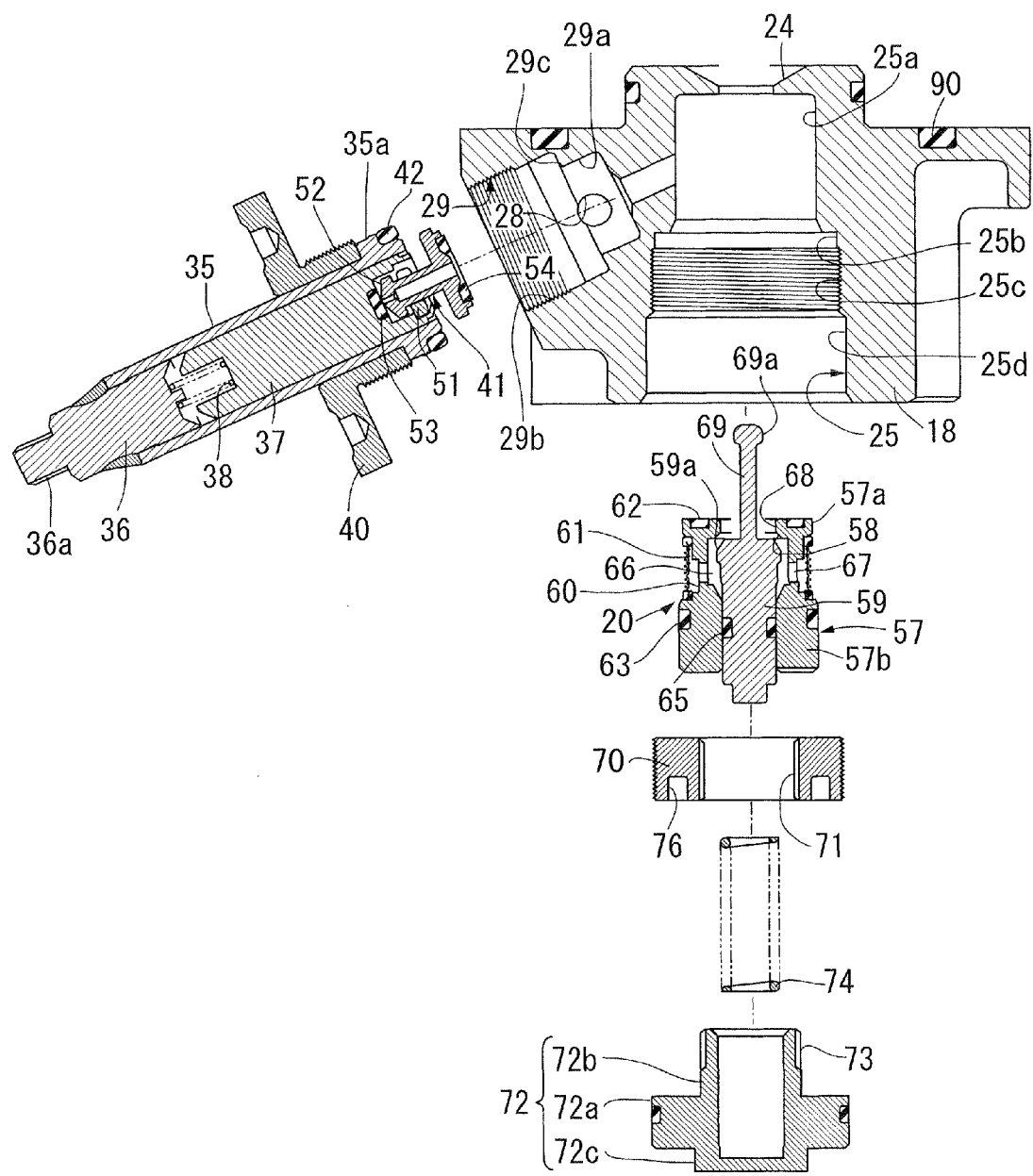
FIG. 3 is a vertical sectional view from the same direction as in FIG. 2 in a state in which a first body member, part of an electromagnetic cut-off valve, a valve mechanism, a retaining member, a rear coil spring, and an adjustment member are separated. (first embodiment)

In FIG. 3, an insertion hole 25 is provided in a central part of the first body member 18, the insertion hole 25 extending vertically while having at its upper end an inward collar 24 protruding radially inward. The insertion hole 25 is formed by coaxially connecting, in sequence from the inward collar 24 side, a small diameter hole 25a, a medium diameter hole 25b having a larger diameter than that of the small diameter hole 25a, a threaded hole 25c having a slightly larger diameter than that of the medium diameter hole 25b, and a large diameter hole 25d having a larger diameter than that of the threaded hole 25c, the lower end of the large diameter hole 25d opening downward on a lower end face of the first body member 18.

Figure 4:
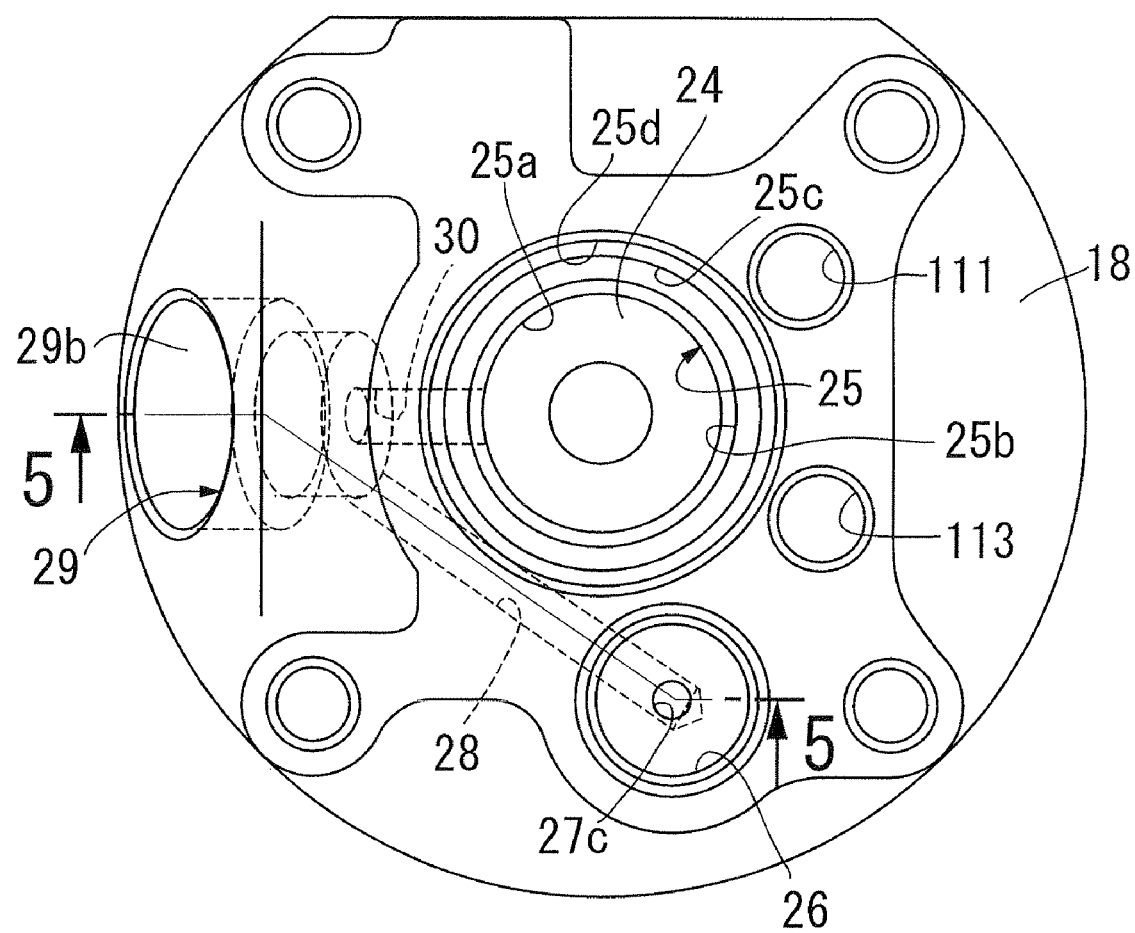
FIG. 4 is a bottom view from arrow 4 in FIG. 1. (first embodiment)
Figure 5:
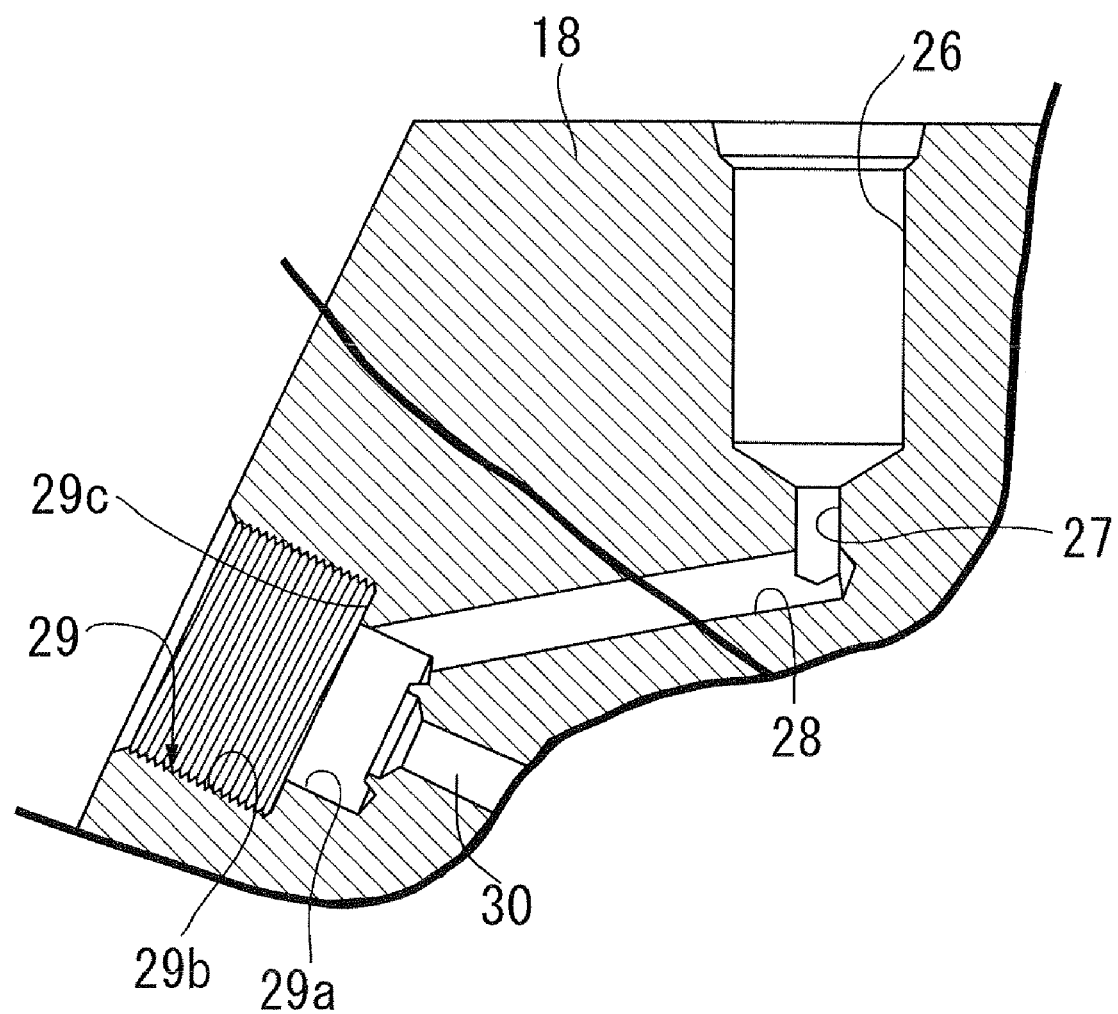
FIG. 5 is an enlarged sectional view along line 5-5 in FIG. 4. (first embodiment)

Referring in addition to FIG. 4 and FIG. 5, an inlet side connection hole 26 is provided in a lower part of the first body member 18, the inlet side connection hole 26 being for introducing compressed natural gas before the pressure is reduced, and a first high pressure passage 27 communicating coaxially with the inlet side connection hole 26, a second high pressure passage 28 extending in a direction obliquely crossing the axis of the inlet side connection hole 26 and the first high pressure passage 27 and having one end connected to the inner end of the first high pressure passage 27, a valve mounting hole 29 opening on a side face of the first body member 18 with an axis obliquely crossing the axis of the second high pressure passage 28 and having the other end of the second high pressure passage 28 opening in an inner end part, and a third high pressure passage 30 coaxially connected to the inner end of the valve mounting hole 29 are provided in the first body member 18.

The electromagnetic cut-off valve 21 includes a coil assembly 34 formed by covering a synthetic resin bobbin 31 and a coil 32 wound around the bobbin 31 with a synthetic resin covering part 33, a guide tube 35 made of a non-magnetic material having one end inserted into the coil assembly 34 and the other end fixed to the first body member 18, a fixed core 36 fixedly secured to the guide tube 35 so as to block the one end of the guide tube 35, a plunger 37 slidably fitted into the guide tube 35 so as to face the fixed core 36, a return spring 38 provided between the fixed core 36 and the plunger 37, a solenoid housing 39 made of a magnetic metal secured to the fixed core 36 so as to cover the coil assembly 34, a magnetic support frame 40 screwed into the body 16 so as to hold the coil assembly 34 between itself and the solenoid housing 39, and a valve member 41 retained by the plunger 37 on the side opposite to the fixed core 36.

Figure 6:
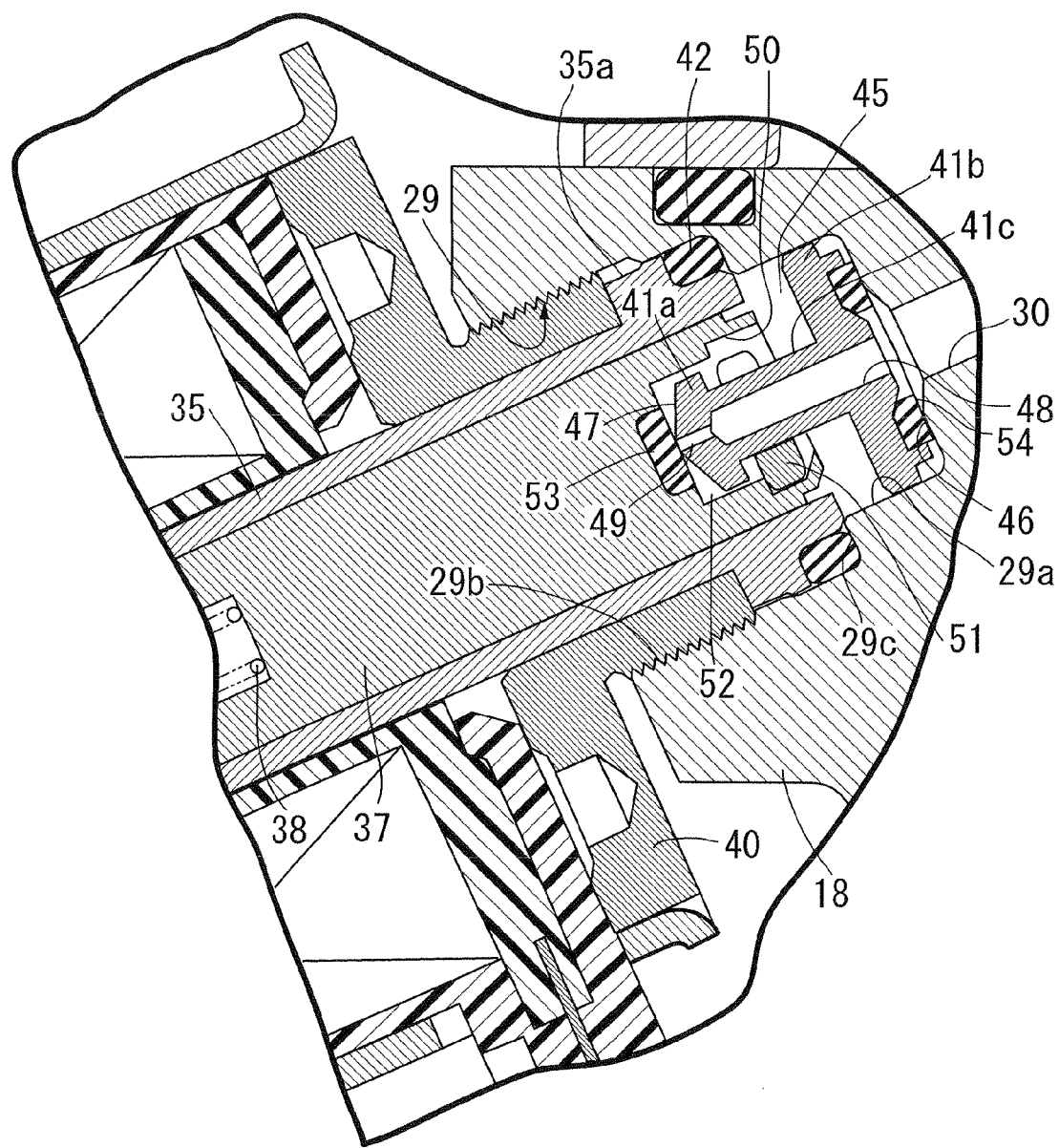
FIG. 6 is an enlarged sectional view showing part of the electromagnetic cut-off valve. (first embodiment)

Referring in addition to FIG. 6, the valve mounting hole 29 is formed from a small diameter portion 29a having the other end of the second high pressure passage 28 opening in a side face and having the third high pressure passage 30 coaxially connected to a central part of the inner end, a large diameter portion 29b having a larger diameter than that of the small diameter portion 29a and being coaxially connected to the outer end of the small diameter portion 29a, and an annular step portion 29c formed between the small diameter portion 29a and the large diameter portion 29b so as to face outward. The guide tube 35, whose the one end is inserted into the bobbin 31, has a collar portion 35a integrally provided with the other end, the collar portion 35a protruding radially outward and having an outer peripheral face in the proximity of and opposite to an inner face of the large diameter portion 29b, and the other end of the guide tube 35 is inserted into the large diameter portion 29b so as to hold an annular seal member 42 between the collar portion 35a and the step portion 29c.

The magnetic support frame 40 is assembled to the first body member 18 by screwing it into the large diameter portion 29b. Moreover, the guide tube 35 is also fixed to the first body member 18 by the seal member 42 and the collar portion 35a being clamped between the step portion 29c and the magnetic support frame 40.

A threaded shaft portion 36a extending through a central part of a closed end of the solenoid housing 39, which has a bottomed cylindrical shape, is integrally provided so as to be connected to the fixed core 36. A cap nut 43 is screwed around a portion of the threaded shaft portion 36a projecting from the solenoid housing 39 with a washer 44 disposed between the cap nut 43 and the solenoid housing 39, and by tightening the cap nut 43 the central part of the closed end of the solenoid housing 39 is secured to the fixed core 36.

Due to the other end of the guide tube 35 being fixed to the first body member 18 while being inserted into the large diameter portion 29b, and the plunger 37 being slidably fitted into the guide tube 35, a main valve chamber 45 is formed between an inner end part of the small diameter portion 29a of the valve mounting hole 29 provided in the first body member 18 and the other ends of the guide tube 35 and the plunger 37, and the second high pressure passage 28 communicates with the main valve chamber 45. Furthermore, a valve seat 46 surrounding an open end of the third high pressure passage 30 in the middle of the inner end part of the small diameter portion 29a is provided on the first body member 18.

The valve member 41 is formed by integrally connecting a pilot valve portion 41a at one end and a main valve portion 41b at the other end via a tubular connecting portion 41c that forms a step between the two valve portions 41a and 41b, the pilot valve portion 41a being formed in a disk shape having at one end face a tapered face 47 that reduces in diameter toward the plunger 37 side, the main valve portion 41b being formed in a disk shape facing the valve seat 46, and the diameter of the pilot valve portion 41a being set so as to be smaller than the diameter of the main valve portion 41b. A first passage 48 that always communicates with the third high pressure passage 30 and a second passage 49 that communicates with the first passage 48 and opens in a central part of one end face of the pilot valve portion 41a are coaxially provided in a central part of the valve member 41, the diameter of the second passage 49 being smaller than that of the first passage 48.

A recess 50 is provided in an end part of the plunger 37 facing the main valve chamber 45, the pilot valve portion 41a being inserted into the recess 50, the pilot valve portion 41a is loosely inserted into the recess 50 and is prevented from coming out from the recess 50 by a C-shaped retaining ring 51 fixed to the other end of the plunger 37, and a pilot valve chamber 52 communicating with the main valve chamber 45 is formed between the pilot valve portion 41a and the plunger 37. Furthermore, a rubber seal 53 blocking an opening of the second passage 49 into the pilot valve chamber 52 when a central part of the one end face of the pilot valve portion 41a is seated is embedded in a central part of a closed end of the recess 50. The retaining ring 51 is fixed to the plunger 37 in a position at which the pilot valve portion 41a can move axially relative to the plunger 37 between the closed end of the recess 50 and the retaining ring 51.

Moreover, an annular rubber seal 54 is embedded in a face of the main valve portion 41b facing the closed end of the small diameter portion 29a, the rubber seal 54 being seated on the valve seat 46 and cutting off the main valve chamber 45 from the third high pressure passage 30.

In such an electromagnetic cut-off valve 21, by cutting off the supply of electric power to the coil 32 the plunger 37 is moved in a direction in which it moves away from the fixed core 36 by the spring force of the return spring 38, the rubber seal 54 of the main valve portion 41b is seated on the valve seat 46 so as to cut off the main valve chamber 45 from the third high pressure passage 30, the pilot valve portion 41a is also seated on the rubber seal 53 so as to cut off the pilot valve chamber 52 from the third high pressure passage 30, and supply of high pressure compressed natural gas to the third high pressure passage 30 side is stopped.

On the other hand, when electric power is supplied to the coil 32, the plunger 37 first moves toward the fixed core 36 side by the extent to which the pilot valve portion 41a moves away from the rubber seal 53, and the second passage 49 communicating with the third high pressure passage 30 via the first passage 48 communicates with the pilot valve chamber 52. This allows compressed natural gas to gradually flow from the main valve chamber 45 to the third high pressure passage 30 through the pilot valve chamber 52, the second passage 49, and the first passage 48, and the difference in pressure acting on the main valve portion 41b from the main valve chamber 45 and the third high pressure passage 30 side decreases. When the electromagnetic force of the coil 32 exceeds the difference in pressure acting on the main valve portion 41b, the plunger 37 moves further toward the fixed core 36 side, the rubber seal 54 of the main valve portion 41b moves away from the valve seat 46, and compressed natural gas flows from the main valve chamber 45 to the third high pressure passage 30.

The valve mechanism 20 is driven by a diaphragm 115, and includes a valve housing 57 that is inserted into and fixed to the insertion hole 25, and a valve body 59 that is connected to the diaphragm 115 and is slidably supported by the valve housing 57 so that it can be seated on a valve seat 58 provided in the valve housing 57.

Referring to FIG. 3, the valve housing 57 is formed in a cylindrical shape having, on axially opposite ends, a small diameter portion 57a at one end, which is on the inward collar 24 side of the first body member 18, and a large diameter portion 57b at the other end having a larger diameter than that of the small diameter portion 57a, an annular recess 60 is provided on the outer periphery of the valve housing 57 in an intermediate section between the small diameter portion 57a and the large diameter portion 57b, and a filter 61 is mounted on the outer periphery of the valve housing 57 so as to surround the annular recess 60.

The valve housing 57 is inserted into the small diameter hole 25a of the insertion hole 25 so that an annular seal member 62 mounted on one end of the small diameter portion 57a is in resilient contact with the inward collar 24, and an annular seal member 63 that is in resilient contact with the inner periphery of the small diameter hole 25a is mounted on the outer periphery of the large diameter portion 57b. In a state in which the valve housing 57 is inserted into the small diameter hole 25a, as shown in FIG. 2, an annular fourth high pressure passage 64 is formed between the inner periphery of the small diameter hole 25a and the valve housing 57, and the third high pressure passage 30 opens on the inner peripheral face of the small diameter hole 25a so as to communicate with the fourth high pressure passage 64.

The valve body 59 extends coaxially and axially movably through the other end part of the valve housing 57, and an annular seal member 65 is mounted on the outer periphery of the valve body 59, the seal member 65 being in resilient sliding contact with the inner periphery of the other end part of the valve housing 57. Moreover, a valve chamber 66 is formed within the valve housing 57 so as to surround the valve body 59, and the valve housing 57 is provided with a plurality of through holes 67 so that the fourth high pressure passage 64 communicates with the valve chamber 66 via the filter 61.

A valve hole 68 coaxial with the valve body 59 is provided in one end part of the valve housing 57, the tapered valve seat 58, which has this valve hole 68 opening in a central part, is formed on an inner face on the extremity side of the valve housing 57 so as to face the valve chamber 66, and an annular seal portion 59a that can be seated on the valve seat 58 is formed on one end part of the valve body 59.

The one end of the valve body 59 is coaxially and integrally provided with a base of a shaft 69 having a smaller diameter than the inner diameter of the valve hole 68 so as to loosely extend through central parts of the valve hole 68 and the inward collar 24, and an enlarged diameter engagement portion 69a is formed at the extremity of the shaft 69.

A ring-shaped retaining member 70 is screwed into the threaded hole 25c of the insertion hole 25, the retaining member 70 abutting against the other end of the valve housing 57 and holding the valve housing 57 between itself and the inward collar 24, and a threaded hole 71 having a larger diameter than that of the valve body 59 is provided in the retaining member 70 coaxially with the valve body 59 so that the other end part of the valve body 59 is inserted into the threaded hole 71. Moreover, a bottomed engagement hole 76 is provided in an end face of the retaining member 70 on the opposite side to the valve housing 57, the engagement hole 76 allowing a tool (not illustrated) for rotating the retaining member 70 in order for it to be screwed into the threaded hole 25c to be detachably engaged therewith.

An open end of the insertion hole 25 is hermetically closed by an adjustment member 72. This adjustment member 72 integrally has a large diameter portion 72a fitted into the large diameter hole 25d of the insertion hole 25 with an annular seal member 75, which is in resilient contact with the inner face of the large diameter hole 25d, mounted on the outer periphery of the large diameter portion 72a, a small diameter portion 72b formed so as to have a smaller diameter than that of the large diameter portion 72a and be coaxially and integrally connected to one end of the large diameter portion 72a while a male thread 73, which is screwed into the threaded hole 71 of the retaining member 70, is cut into the outer periphery thereof, and a tool engagement portion 72c, which is formed in, for example, a hexagonal shape so as to allow a tool (not illustrated) to engage therewith, coaxially provided at the other end of the large diameter portion 72a so as to project therefrom. By engaging a tool with the tool engagement portion 72c and rotating it in a state in which the male thread 73 is screwed into the threaded hole 71 of the retaining member 70, the adjustment member 72 can be moved back and forth in a direction along an axis that is coaxial with the valve body 59 of the valve mechanism 20.

Furthermore, a rear coil spring 74 is provided in a compressed state between the small diameter portion 72b of the adjustment member 72 and the other end of the valve body 59 of the valve mechanism 20, and adjusting the back and forth position of the adjustment member 72 along the axial direction by rotation of the adjustment member 72 enables the spring load of the rear coil spring 74 to be adjusted.

Figure 7:
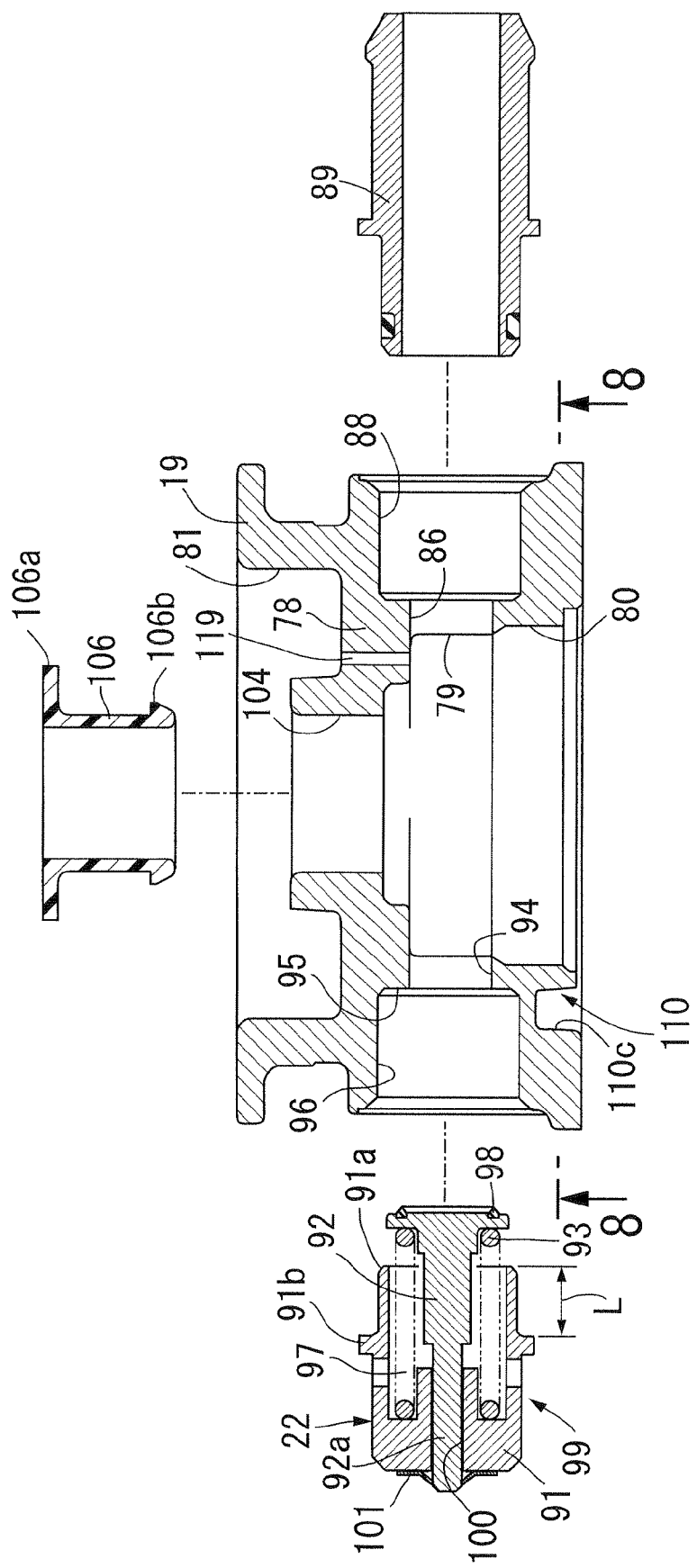
FIG. 7 is a vertical sectional view from the same direction as in FIG. 2 in a state in which a second body member, a relief valve, and an outlet side connection tube are separated. (first embodiment)
Figure 8:
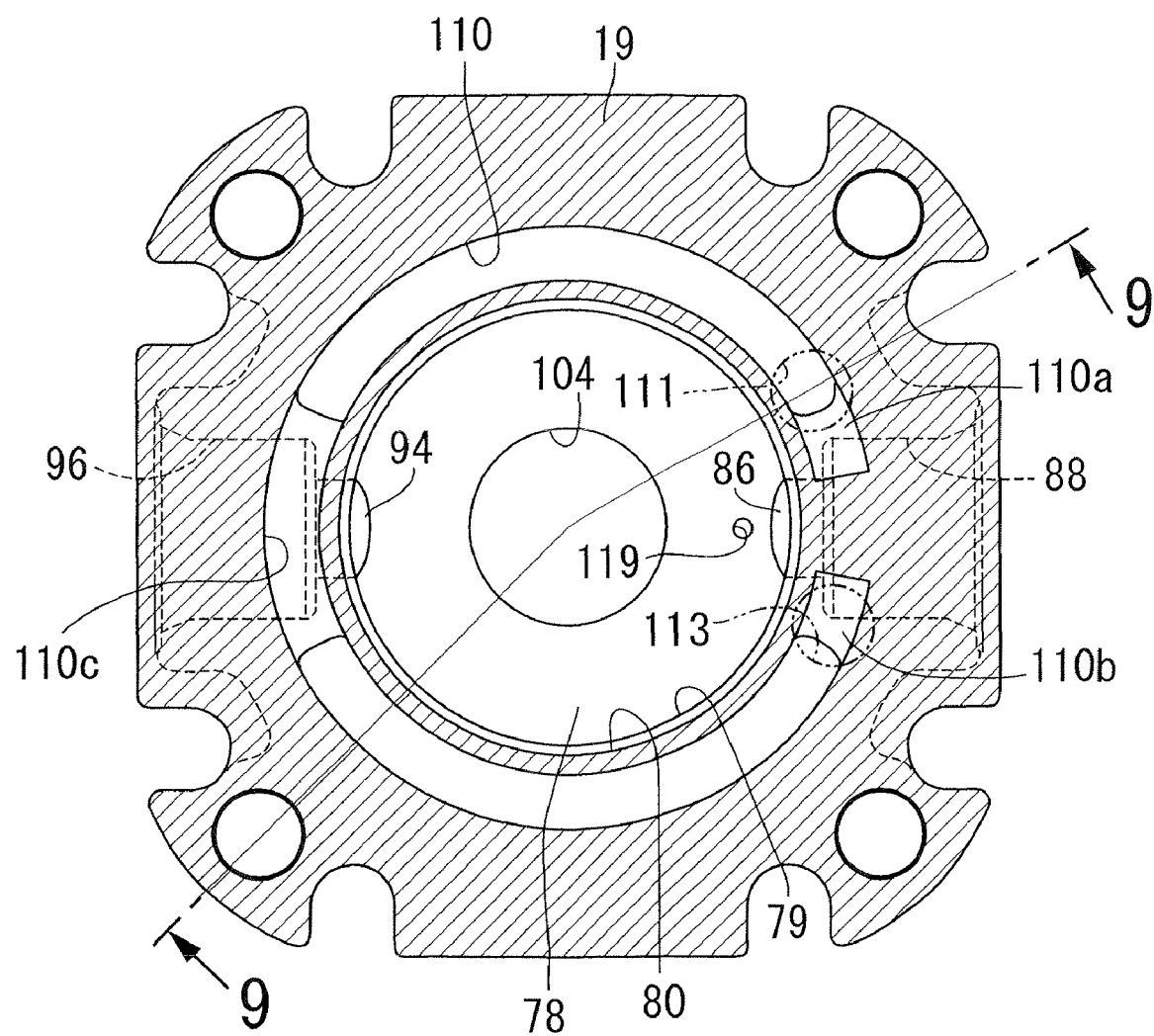
FIG. 8 is a sectional view along line 8-8 in FIG. 7. (first embodiment)
Figure 9:
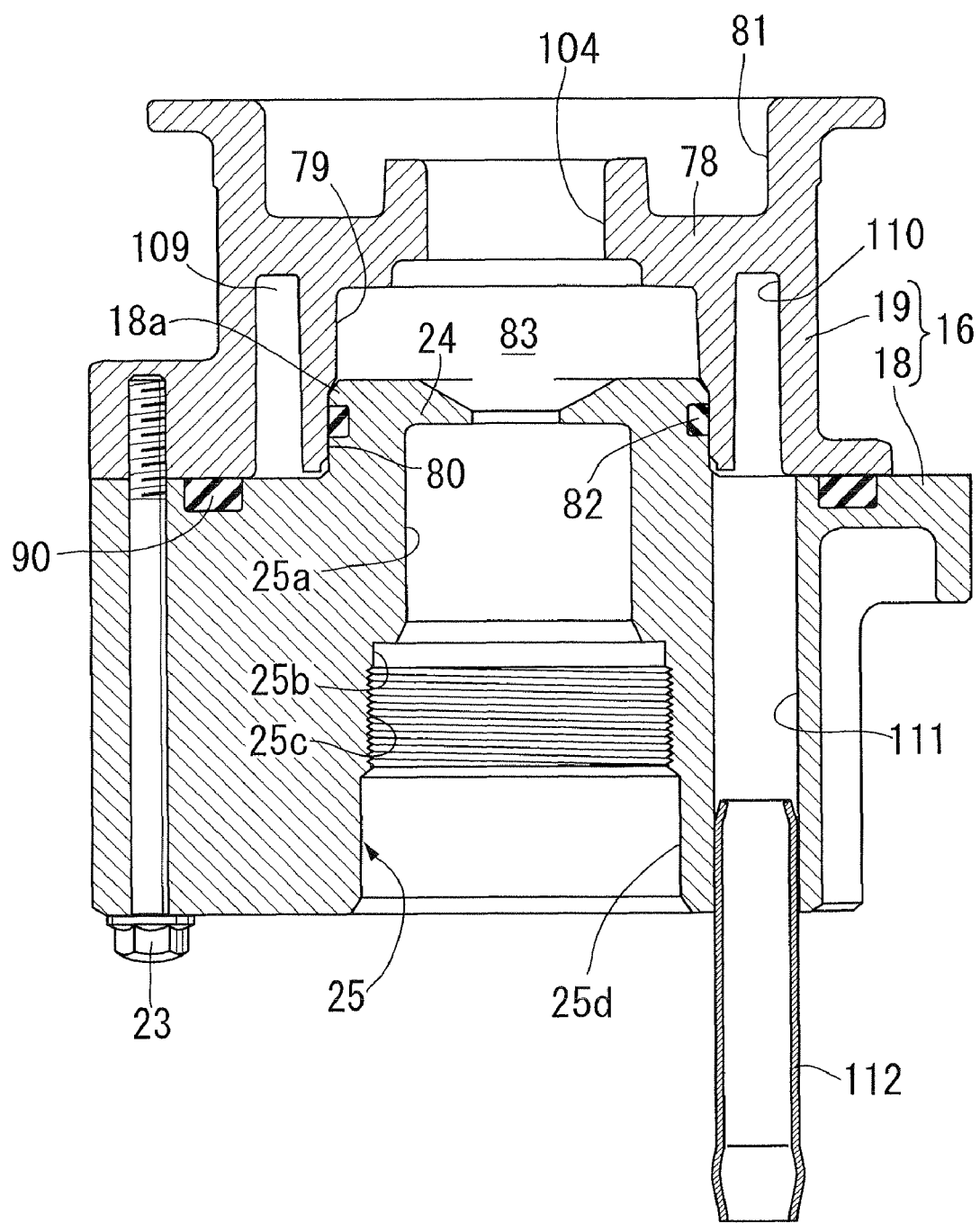
FIG. 9 is a sectional view along line 9-9 in FIG. 8. (first embodiment)

Referring in addition to FIG. 7 to FIG. 9, a partition wall 78 positioned in an intermediate part, along the axis of the valve mechanism 20 disposed on the first body member 18 side, is provided in the second body member 19; a pressure reduction chamber-forming hole 79 and a fitting hole 80 having a larger diameter than that of the pressure reduction chamber-forming hole 79 are provided, in sequence from the partition wall 78 side so that they communicate with each other, in the second body member 19 on the first body member 18 side relative to the partition wall 78 coaxially with the insertion hole 25 provided in the first body member 18, and a pressure action chamber-forming hole 81 is provided, coaxially with the pressure reduction chamber-forming hole 79 and the fitting hole 80, in the second body member 19 on the side opposite to the first body member 18 relative to the partition wall 78.

A circular cross-section fitting projection 18a, which is coaxial with the insertion hole 25, is projectingly provided integrally with the first body member 18, and this fitting projection 18a is fitted into the fitting hole 80. An annular seal member 82, which is in resilient contact with the inner periphery of the fitting hole 80, is mounted on the outer periphery of the fitting projection 18a, and the fitting projection 18a is hermetically fitted into the fitting hole 80.

In a state in which the fitting projection 18a is fitted into the fitting hole 80, the first and second body members 18 and 19 are joined by the bolts 23 with an annular seal member 90 present therebetween, the seal member 90 being mounted on the first body member 18 so as to surround the fitting projection 18a, and in a state in which the first and second body members 18 and 19 are joined, a pressure reduction chamber 83 is formed between the extremity of the fitting projection 18a and the partition wall 78, the outer periphery of the pressure reduction chamber 83 as a first low pressure chamber being defined by the pressure reduction chamber-forming hole 79, and the pressure reduction chamber 83 communicating with the valve hole 68 of the valve mechanism 20.

A back pressure chamber 84 as a second low pressure chamber is formed within the insertion hole 25, whose open end is hermetically closed by the adjustment member 72, the other end of the valve body 20 of the valve mechanism 20 facing the back pressure chamber 70; this back pressure chamber 84 is hermetically separated from the annular fourth high pressure passage 64 formed between the valve housing 57 and the first body member 18 within the small diameter hole 25a of the insertion hole 25 as a result of the seal member 63 mounted on the outer periphery of the valve housing 57 being in resilient contact with the inner face of the small diameter hole 25a and the seal member 65 mounted on the outer periphery of the valve body 59 being in resilient contact with the inner periphery of the valve housing 57. Moreover, a small diameter communication passage 85 as a first low pressure passage (see FIG. 2) providing communication between the pressure reduction chamber 83 and the back pressure chamber 84 is provided in the first body member 18, and the back pressure chamber 84 communicates with the pressure reduction chamber 83.

An outlet passage 86, which is a second low pressure passage, having an inner end opening on an inner face of the pressure reduction chamber-forming hole 79 is provided in the second body member 19 so that its axis is along the radial direction of the pressure reduction chamber-forming hole 79. That is, the outlet passage 86 communicates with the pressure reduction chamber 83, and an outlet side connection tube 89 for guiding out compressed natural gas whose pressure has been reduced is hermetically connected by press fitting, etc. to an outlet side connection hole 88 provided in the second body member 19 so as to coaxially communicate with the outlet passage 86.

The relief valve 22 opens in response to the pressure within the pressure reduction chamber 83 becoming a preset pressure or above, and is formed from the second body member 19 of the body 16, a guide body 91 fixed to the second body member 19, a valve body 92 guided by the guide body 91, and a spring 93 provided in a compressed state between the guide body 91 and the valve body 92.

Referring in particular to FIG. 7, a valve hole 94 as a third low pressure passage and a housing hole 96 are provided in the second body member 19 so as to be coaxial with each other, the valve hole 94 having its axis coaxial with the outlet passage 86 and communicating with the pressure reduction chamber 83, the housing hole 96 having at its inner end an annular valve seat 95 whose central part is faced by the valve hole 94 and having a larger diameter than that of the valve hole 94, and the outer end of the housing hole 96 opening to the exterior. The guide body 91 is fixed to the second body member 19 so as to form between the guide body 91 and the second body member 19 a valve chamber 97 communicating with the exterior, the valve body 92, which is guided by the guide body 91 and can move in a direction along the axis of the housing hole 96, is housed in the valve chamber 97 so that the valve body 92 can be seated on the valve seat 95, and the spring 93 is provided in a compressed state between the valve body 92 and the guide body 91 while exhibiting a predetermined spring force urging the valve body 92 so that it is seated on the valve seat 95. A seat portion 98 provided on either one of the valve body 92 and the valve seat 95, in this embodiment the valve body 92, is made of rubber.

Moreover, when fixing the guide body 91 to the second body member 19, the guide body 91 is fixed to the second body member 19 while compressing the spring 93 between itself and the valve body 92 seated on the valve seat 95, and the guide body 91 is integrally provided with a guide tube portion 91a that is fitted into the housing hole 96 by only a predetermined guide distance L until fixing of the guide body 91 to the second body member 19 is completed. That is, the guide tube portion 91a is provided with a collar portion 91b protruding radially outward at a position spaced from the extremity thereof by only the guide distance L, and the guide tube portion 91a is fitted into the housing hole 96 until the collar portion 91b abuts against an outside face of the second body member 19. In this embodiment, the guide body 91 is fixed to the second body member 19 by the guide tube portion 91a thereof being press fitted into the housing hole 96 by only the predetermined guide distance L.

Furthermore, the guide body 91, the valve body 92, and the spring 93 are formed as a guide body assembly 99 so that the valve body 92 can move relative to the guide body 91, a valve shaft 92a coaxially connected to the valve body 92 is slidably fitted into a guide hole 100 provided coaxially in the guide body 91, and a clip 101 is engaged with the valve shaft 92a projecting from the guide hole 100, the clip 101 abutting against the guide body 91 from the side opposite to the valve seat 95 so as to restrict movement of the valve body 92 due to the spring urging force of the spring 93.

The guide distance L by which the guide tube portion 91a of the guide body 91 is fitted (press fitted) into the housing hole 96 is the sum of a no-load guide section in which the spring force of the spring 93 does not act on the valve seat 95 via the valve body 92 and a loaded guide section in which the spring force of the spring 93 acts on the valve seat 95 via the valve body 92, and in this embodiment the guide distance L is set larger than a distance by which the spring 93 is compressed from the free length up to the point at which the predetermined spring force is exhibited. That is, the spring 93 of the guide body assembly 99 prior to it being assembled to the second body member 19 is in a state in which it is not compressed from the free state, and in this embodiment the guide distance L is set larger than the distance by which the spring 93 is compressed so as to exhibit the predetermined spring force when the spring 93 in the free state is compressed by continuing fitting (press fitting) of the guide body 91 into the housing hole 96 after the valve body 92 abuts against the valve seat 95 when the guide body assembly 99 is assembled to the second body member 19. Alternatively, the guide distance L may be set so that an engagement position of the clip 101 with the valve shaft 92a is set so that, in a state in which the guide body assembly 99 is assembled, the spring 93 is compressed from the free state until a spring force that is smaller than the predetermined spring force is exhibited, and by further fitting (press fitting) the guide body 91 into the housing hole 96 after the valve body 92 abuts against the valve seat 95, the spring 93 exhibits the predetermined spring force.

A through hole 104 coaxial with the valve body 59 of the valve mechanism 20 is provided in a central part of the partition wall 78 of the second body member 19, and a guide member 106 formed from a synthetic resin is fitted into the through hole 104, a valve shaft 105 having one end connected coaxially to a central part of the diaphragm 115 and having the other end connected to the valve body 59 being slidably fitted into the guide member 106.

A flange portion 106a is integrally provided at one end of the guide member 106, the flange portion 106a abutting against one of opposite faces of the partition wall 78, and an engagement portion 106b capable of flexing so that it can be inserted into the through hole 104 is integrally provided with the other end of the guide member 106, the engagement portion 106b resiliently engaging with the other face of the partition wall 78 in a state in which it projects from the through hole 104, in this embodiment the engagement member 106b resiliently engaging with the partition wall 78 on the pressure reduction chamber 83 side.

An engagement groove 107 opening on a side face of the valve shaft 105 is provided at one end part of the valve shaft 105 on the valve mechanism 20 side, the engagement groove 107 extending along a plane perpendicular to the axis of the valve shaft 105, and a slit 108 extending between an end face of the valve shaft 105 on the valve mechanism 20 side and the engagement groove 107 is provided so as to open on a side face of the valve shaft 105 in the same direction as the engagement groove 107.

The shaft 69 coaxially and integrally connected to the valve body 59 of the valve mechanism 20 is inserted through the slit 108 so that the enlarged diameter engagement portion 69a engages with the engagement groove 107, thereby connecting one end of the valve body 59 of the valve mechanism 20 to the valve shaft 105.

Figure 10:
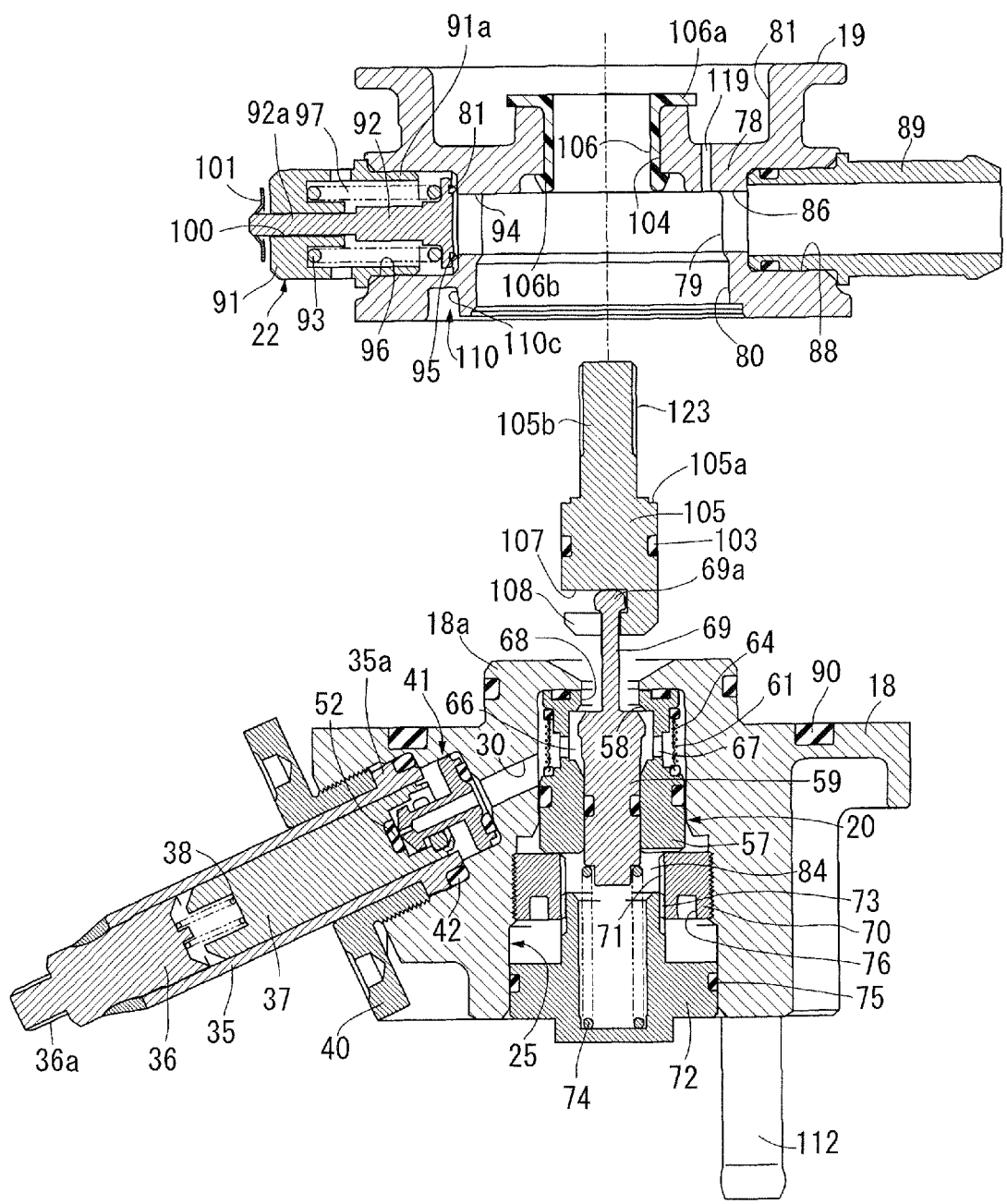
FIG. 10 is a vertical sectional view showing the state before the first body member and the second body member are assembled. (first embodiment)

As shown in FIG. 10, the first and second body members 18 and 19 are joined to each other so that the valve shaft 105 is fitted into the guide member 106 in a state in which part of the electromagnetic cut-off valve 21, the valve mechanism 20, the retaining member 70, the adjustment member 72, the rear coil spring 74, etc. are mounted on the first body member 18 side, the valve body 59 of the valve mechanism 20 is connected to the valve shaft 105, and the relief valve 22, the outlet side connection tube 89, the guide member 106, etc. are mounted on the second body member 19 side, and in a state in which the first and second body members 18 and 19 are joined, a heating medium passage 109 for allowing engine cooling water, which is a heating medium, to flow through is formed between the first and second body members 18 and 19.

This heating medium passage 109 is formed in an arc shape surrounding the valve body 59 and the valve seat 58 when viewed in a direction along the axis of the valve body 59 in the valve mechanism 20, is disposed at substantially the same position as the valve seat 58 in a direction along the axis of the valve body 59, and is disposed so as to surround the fitting projection 18a of the first body member 18 further inward than the annular seal member 90 disposed between the first and second body members 18 and 19.

Moreover, a groove 110 is provided in at least one of joining faces of the first and second body members 18 and 19, in this embodiment the face of the second body member 19 joining it to the first body member 18, the groove 110 forming the heating medium path 109 between the first and second body members 18 and 19. Furthermore, the second body member 19 is molded, and the groove 110 is formed at the same time as molding of the second body member 19.

Referring to FIG. 8, the groove 110 is formed in an arc shape coaxially surrounding the fitting hole 80, peripherally opposite ends of the groove 110 being disposed in a portion corresponding to the outlet side connection hole 88, shallow groove portions 110a and 110b of the groove 110, which are shallow so as not to interfere with the outlet passage 86 and the outlet side connection hole 88, are formed in portions corresponding to the outlet passage 86 and the outlet side connection hole 88 in peripherally opposite end portions of the groove 110, and a shallow groove portion 110c of the groove 110, which is shallow so as not to interfere with the valve hole 94 and the housing hole 96, is formed in a portion corresponding to the valve hole 94 and the housing hole 96 for the relief valve 22 in a peripherally intermediate portion of the groove 110.

The first body member 18 is provided with a medium inlet passage 111 and a medium outlet passage 113 that extend vertically, the medium inlet passage 111 communicating with one end, in the peripheral direction, of the heating medium passage 109, the medium outlet passage 113 communicating with the other end, in the peripheral direction, of the heating medium passage 109, and an inlet pipe 112 communicating with the medium inlet passage 111 and an outlet pipe 114 communicating with the medium outlet passage 113 are connected to the lower end of the first body member 18 so as to extend downward.

Figure 11:
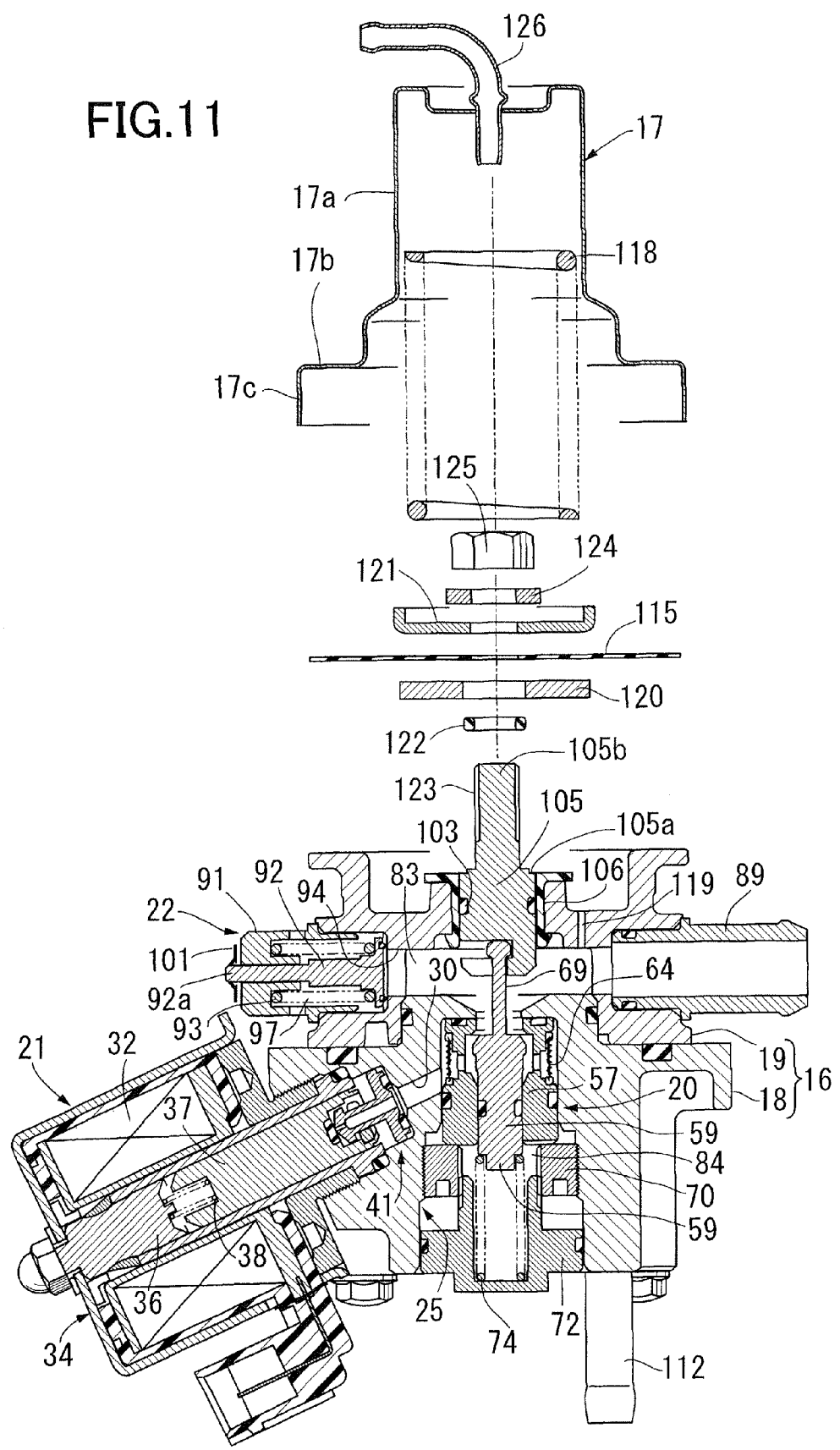
FIG. 11 is a vertical sectional view showing the state before a diaphragm and a diaphragm cover are assembled on the body side. (first embodiment)

Referring in addition to FIG. 11, a peripheral edge part of the diaphragm 115 is clamped between the second body member 19 of the body 16 and the diaphragm cover 17 mounted on the second body member 19, a pressure action chamber 116 as a third low pressure chamber is formed between the second body member 19 and the diaphragm 115 so that one face of the diaphragm 115 faces the pressure action chamber 116, the outer periphery of the pressure action chamber 116 being defined by the pressure action chamber-forming hole 81 of the second body member 19, and a spring chamber 117 is formed between the diaphragm 115 and the diaphragm cover 17 so that the other face of the diaphragm 115 faces the spring chamber 117, a coil spring 118 housed in the spring chamber 117 being provided in a compressed state between the diaphragm cover 17 and the diaphragm 115. Moreover, the partition wall 78 of the second body member 19 is provided with a communication passage 119 providing communication between the pressure action chamber 116 and the pressure reduction chamber 83, and when gas is passing through the pressure of the pressure action chamber 116 is lower than the pressure of the pressure reduction chamber 83.

The first to fourth high pressure passages 27, 28, 30, and 64, through which high pressure gas flows, the small diameter communication passage 85, the outlet passage 86, the valve hole 94, and the communication passage 119, which are first to fourth low pressure passages, and the pressure reduction chamber 83, the back pressure chamber 84, and the pressure action chamber 116, which are first to third low pressure chambers, are formed in the body 16, and whereas all of the first to fourth high pressure passages 27, 28, 30, and 64 are formed within the first body member 18, which has a high strength, at least some of the small diameter communication passage 85, the outlet passage 86, the valve hole 94, the communication passage 119, the pressure reduction chamber 83, the back pressure chamber 84, and the pressure action chamber 116, in this embodiment the outlet passage 86, the valve hole 94, and the communication passage 119, are formed in the second body member 19, which has a low strength, the small diameter communication passage 85 is formed in the first body member 18, the pressure reduction chamber 83 is formed between the first and second body members 18 and 19, and the pressure action chamber 116 is formed between the second body member 19 and the diaphragm 115.

The diaphragm cover 17 is formed by press forming thin metal so as to integrally have a bottomed cylindrical portion 17a having a closed end at the end on the side opposite to the diaphragm 115, a collar portion 17b protruding radially outward from the open end of the bottomed cylindrical portion 17a, and a cylindrical portion 17c extending from the outer peripheral edge of the collar portion 17b to the body 16 side.

The peripheral edge part of the diaphragm 115 is held between the second body member 19 and the collar portion 17b of the diaphragm cover 17, and by swaging part of the cylindrical portion 17c of the diaphragm cover 17 toward the inside so that it engages with the second body member 19, the diaphragm cover 17 is joined to the second body member 19 while clamping the peripheral edge part of the diaphragm 115 between itself and the second body member 19.

A ring-shaped first retainer 120 abuts against a central part of a face of the diaphragm 115 facing the pressure action chamber 116, and a ring-shaped second retainer 121 abuts against a central part of a face of the diaphragm 115 facing the spring chamber 117.

The valve shaft 105 connected to the valve body 59 of the valve mechanism 20 is coaxially provided with an annular engagement portion 105a engaging with the inner periphery of the first retainer 120 and a shaft portion 105b inserted into the central parts of the first retainer 120, the diaphragm 115, and the second retainer 121, and a male thread 123 is cut into the outer periphery of the shaft portion 105b. A nut 125 is screwed around the male thread 123 of the shaft portion 105b inserted into the central parts of the first retainer 120, the diaphragm 115, and the second retainer 121 with an O ring 122 disposed between the shaft portion 105b and the first retainer 120, and a washer 124 is interposed between the nut 125 and the second retainer 121; by tightening the nut 125 the diaphragm 115 is coaxially and operatively connected to one end of the valve body 59 of the valve mechanism 20.

The coil spring 118 is provided in a compressed state between the second retainer 121 and the closed end of the bottomed cylindrical portion 17a of the diaphragm cover 17. The spring load of the coil spring 118 acts on the valve body 59 of the valve mechanism 20 in a valve-opening direction, but the spring load of the rear coil spring 74 provided in a compressed state between the valve body 59 and the adjustment member 72 acts on the valve body 59 in a valve-closing direction, and adjusting the spring load of the rear coil spring 74 also adjusts the spring load of the coil spring 118 in practice.

Furthermore, a negative pressure inlet tube 126 communicating with the spring chamber 117 is connected to the closed end of the bottomed cylindrical portion 17a of the diaphragm cover 17 by, for example, press fitting or brazing; this negative pressure inlet tube 126 is connected to the engine, and engine intake negative pressure is introduced into the spring chamber 117.

When such a diaphragm 115 flexes to the spring chamber 117 side against the spring force of the coil spring 118 due to the pressure of the pressure action chamber 116 the valve mechanism 20 closes, when the diaphragm 115 flexes to the pressure action chamber 116 side due to the pressure of the pressure action chamber 116 decreasing the valve mechanism 20 opens, and by repeating such opening and closing of the valve mechanism 20 high pressure compressed natural gas is reduced in pressure and discharged via the outlet side connection tube 89.

The operation of this embodiment is now explained. The diaphragm cover 17 is formed by press forming thin metal so as to integrally have the bottomed cylindrical portion 17a, which has its closed end abutting against an end part, on the opposite side to the diaphragm 115, of the coil spring 118 provided in a compressed state between the diaphragm 115 and the diaphragm cover 17, the adjustment member 72 is screwed into the first body member 18 of the body 16 on the side opposite to the diaphragm 115 relative to the valve body 59 having one end operatively connected to the diaphragm 115, the adjustment member 72 being capable of moving back and forth in a direction along the same axis as that of the valve body 59, and the rear coil spring 74 is disposed between the adjustment member 72 and the other end part of the valve body 59, the rear coil spring 74 changing its spring load according to changes in the axial back and forth position of the adjustment member 72.

The diaphragm cover 17 is thus formed by press forming thin metal, thereby reducing the cost and weight as well as the size. Moreover, the spring load of the rear coil spring 74 can be changed according to changes in the axial back and forth position of the adjustment member 72, the valve body 59 has acting on it a force in a valve-closing direction due to the difference in pressure between the pressure action chamber 116 and the spring chamber 117 and due to the spring force of the rear coil spring 74 and a force in a valve-opening direction due to the spring force of the coil spring 118 provided in a compressed state between the diaphragm cover 17 and the diaphragm 115, and by adjusting the spring load of the rear coil spring 74 the same action as that of adjustment of the spring load of the coil spring 118 between the diaphragm cover 17 and the diaphragm 115 can be obtained.

Moreover, since the insertion hole 25 opening on the side opposite to the diaphragm cover 17 is provided in the first body member 18 of the body 16 so as to be coaxial with the valve body 59 so that the valve mechanism 20, which includes the valve body 59, can be inserted into the insertion hole 25, and the open end of the insertion hole 25 is hermetically closed by the adjustment member 72, assembly can be carried out by inserting the valve mechanism 20, which includes the valve body 59, into the insertion hole 25 from the opposite side to the diaphragm 115 and screwing the adjustment member 72 thereinto, thus enhancing the ease of assembly and thereby hermetically closing the insertion hole 25 with the adjustment member 72.

Furthermore, since the back pressure chamber 84, which communicates with the pressure reduction chamber 83 while being hermetically separated from the first to fourth high pressure passages 27, 28, 30, and 64 formed within the first body member 18 of the body 16, is formed within the insertion hole 25 whose open end is hermetically closed by the adjustment member 72, so that the other end of the valve body 59 faces the back pressure chamber 84, it is possible to smoothly operate the valve body 59 by making the pressure of the pressure reduction chamber 83 act on opposite ends of the valve body 59 so that there is no difference in pressure that will drive the valve body 59 in the axial direction, and even if swarf is formed due to rubbing of a member that is in contact with the rear coil spring 74, it is possible to prevent as far as possible the swarf from being caught between the valve body 59 and the valve seat 58.

Furthermore, the body 16 is formed by joining the plurality of body members having different strengths, in this embodiment the first and second body members 18 and 19, and all of the first to fourth high pressure passages 27, 28, 30, and 64, through which high pressure gas flows, are formed within the first body member 18, which has a high strength, and at least some of the small diameter communication passage 85, the outlet passage 86, the valve hole 94, and the communication passage 119, which are first to fourth low pressure passages, and the pressure reduction chamber 83, the back pressure chamber 84, and the pressure action chamber 116, which are first to third low pressure chambers, in this embodiment the outlet passage 86, the valve hole 94, and the communication passage 119, are formed in the second body member 19, which has a low strength, and it is thus possible to reduce the cost by avoiding forming the entire body 16 from a material having a higher strength than required. Moreover, by employing neither too much nor too little of a portion formed from a high strength material for a portion on which high pressure gas acts, the proportion of the low strength second body member 19 occupying the entire body 16 is increased, thus further reducing the cost.

Furthermore, the valve mechanism 20 having the valve hole 68 opening in a central part and having the valve body 59 that can be seated on the valve seat 58 facing the valve chamber 66 communicating with the first to fourth high pressure passages 27, 28, 30, and 64 is housed within the body 16, the valve hole 68 communicating with the small diameter communication passage 85, the outlet passage 86, the valve hole 94, and the communication passage 119, which are first to fourth low pressure passages, and the pressure reduction chamber 83, the back pressure chamber 84, and the pressure action chamber 116, which are first to third low pressure chambers, and the valve body 59 being connected to the diaphragm 115 that operates in response to the pressure of the pressure reduction chamber 83, which communicates with the outlet passage 86; the insertion hole 25, which coaxially houses the valve mechanism 20, is provided in the high strength first body member 18, the first and second body members 18 and 19 are joined so as to overlap each other in a direction along the axis of the valve body 59 while forming the pressure reduction chamber 83 therebetween, and the circular cross-section fitting projection 18*a* integrally and projectingly provided on the first body member 18 coaxially with the insertion hole 25 is hermetically fitted into the second body member 19, thus making it possible to easily obtain concentricity for the first and second body members 18 and 19.

Furthermore, since at least one of joining faces of the first and second body members 18 and 19, in this embodiment the face of the second body member 19 joining it to the first body member 18, is provided with the groove 110 for forming between the two body members 18 and 19 that are joined to each other the heating medium passage 109 through which the heating medium flows, it is possible to avoid the overall size of the body 16 from increasing due to the formation of the heating medium passage 109, it is unnecessary to form a heating medium passage using another component, thus preventing any increase in the number of components, and it is possible to prevent the temperature of the body 16 from decreasing.

Moreover, since the second body member 19 in which the groove 110 is formed is molded, and the groove 110 is formed at the same time as molding of the second body member 19, it is unnecessary to carry out machining for forming the groove 110, thus reducing the cost.

Furthermore, since the heating medium passage 109 is formed in an arc shape surrounding the valve body 59 and the valve seat 58 when viewed in a direction along the axis of the valve body 59, it is possible to heat effectively the surroundings of the valve seat 58 and the valve body 59, whose temperatures easily decrease during the pressure reduction action accompanying operation of the valve mechanism 20 and, moreover, due to the heating medium passage 109 having an arc shape the surroundings of the valve seat 58 and the valve body 59 can be substantially evenly heated.

Furthermore, the heating medium passage 109 is disposed at substantially the same position as the valve seat 58 in the direction along the axis of the valve body 59, and it is possible to heat effectively the surroundings of the valve seat 58 and the valve body 59, whose temperatures easily decrease during the pressure reduction action accompanying operation of the valve mechanism 20.

Moreover, since engine cooling water is introduced into the heating medium passage 109, the body 16 can be heated by utilizing effectively the engine cooling water.

Furthermore, the valve shaft 105 for operatively connecting the central part of the diaphragm 115 and the valve body 59 of the valve mechanism 20 extends slidably through the partition wall 78 disposed between the pressure action chamber 116, which the one face of the diaphragm 115 faces, and the pressure reduction chamber 83, which communicates with the pressure action chamber 116, the partition wall 78 is provided with the through hole 104 coaxial with the valve body 59, the one end of the cylindrical guide member 106 made of a synthetic resin and fitted into the through hole 104 is provided integrally with the flange portion 106a abutting against one of opposite faces of the partition wall 78, the other end of the guide member 106 is integrally provided with the engagement portion 106b capable of flexing so that it can be inserted into the through hole 104 so that the engagement portion 106b resiliently engages with the other face of the partition wall 78 in a state in which it projects from the through hole 104, and the valve shaft 105 is slidably fitted into the guide member 106 so as to extend through the guide member 106.

The valve shaft 105 is therefore guided by the guide member 106, which is made of a synthetic resin, thus enabling the production of abraded powder accompanying sliding of the valve shaft 105 to be suppressed. Moreover, even if the through hole 104 provided in the partition wall 78 is formed when casting the second body member 19 and has high surface roughness, by fitting the guide member 106 into the through hole 104 the sliding properties of the valve shaft 105 can be enhanced, and it is possible to make it unnecessary to subject the partition wall to secondary machining in order to increase the smoothness of the through hole 104, thus reducing the cost. Furthermore, when the guide member 106 is fitted into the through hole 104 until the flange portion 106a at one end thereof abuts against one face of the partition wall 78, since the engagement portion 106b at the other end of the guide member 106 resiliently engages with the other face of the partition wall 78, it is easy to assemble the guide member 106 to the partition wall 78 without employing a special tool.

Furthermore, the relief valve 22 is mounted on the second body member 19 of the body 16, this relief valve 22 including the second body member 19 provided with the housing hole 96 having at its inner end the annular valve seat 95, a central part of which the valve hole 94 communicating with the pressure reduction chamber 83 faces, the guide body 91 fixed to the second body member 19 so as to form between the guide body 91 and the second body member 19 the valve chamber 97 communicating with the exterior, the valve body 92 guided by the guide body 91 so as to move along the axis of the housing hole 96 and housed in the valve chamber 97 so as to be seated on the valve seat 95, and the spring 93 provided in a compressed state between the valve body 92 and the guide body 91 so as to exhibit a predetermined spring force urging the valve body 92 so as to seat it on the valve seat 95; when the guide body 91 is fixed to the second body member 19, the guide body 91 is fixed to the second body member 19 while compressing the spring 93 disposed between the guide body 91 and the valve body 92, and the guide body 91 is integrally provided with the guide tube portion 91a, which is fitted into the housing hole 96 by only the predetermined guide distance L until fixing of the guide body 91 to the second body member 19 is completed. Moreover, the guide distance L is the sum of the no-load guide section in which the spring force of the spring 93 does not act on the valve seat 95 via the valve body 92 and the loaded guide section in which the spring force of the spring 93 acts on the valve seat 95 via the valve body 92.

Therefore, when the guide body 91 is fitted into the housing hole 96, after the guide body 91 is fitted into the housing hole 96 by only the no-load guide section while the valve body 92 is centered by the guide body 91 in a state in which no load acts between the valve body 92 and the valve seat 95, partway through the guide body 91 being fitted into the housing hole 96 by only the loaded guide section, the spring force of the spring 93 acts on the valve seat 95; in a state in which a load acts between the valve body 92 and the valve seat 95, no misalignment occurs between the valve seat 95 and the valve body 92 seated on the valve seat 95, no tilting occurs between the valve body 92 and the valve seat 95, and no galling occurs between the valve body 95 and the guide body 91.

Furthermore, in this embodiment, since the guide distance L by which the guide tube portion 91a is press fitted into the housing hole 96 is larger than the compression distance from the free length of the spring 93 up to the point at which the predetermined spring force is exhibited, within the guide distance L of the guide body 91, the press fitting distance from the free state of the spring 93 prior to it being compressed is the no-load guide section, and tilting or misalignment between the valve seat 95 and the valve body 92 can reliably be prevented.

Moreover, although the seat portion of either one of the valve body 92 and the valve seat 95, in this embodiment the seat portion 98 of the valve body 92, is made of rubber, since no tilting occurs between the valve body 92 and the valve seat 95, the seat portion 98 will not be broken due to the tilting.

Furthermore, since the guide body 91 is fixed to the second body member 19 by press fitting the guide tube portion 91a into the housing hole 96 by only the guide distance L, the structure for fixing the guide body 91 to the second body member 19 can be simplified, and assembly can be made easy.

Moreover, since the guide body 91, the valve body 92, and the spring 93 are formed as the guide body assembly 99 in which the valve body 92 can move relative to the guide body 91, when assembling the guide body 91 onto the first body member 19 by fitting (press fitting) it into the housing hole 96, the distance from the start of guiding of the guide body 91 to the point at which the valve body 92 is seated on the valve seat 95 can easily be made the no-load guide section, and assembly of the relief valve 22 becomes easier while reliably preventing tilting and misalignment between the valve seat 95 and the valve body 92. Furthermore, since the valve shaft 92a coaxially connected to the valve body 92 is slidably fitted into the guide hole 100 provided in the guide body 91, which is coaxial with the guide tube portion 91a, and the clip 101 capable of abutting against the guide body 91 so as to restrict movement of the valve body 92 due to the spring urging force of the spring 93 engages with the valve shaft 92a projecting from the guide hole 100, the guide body assembly 99 can be formed by a simple structure in which the clip 101, which can abut against the guide body 91, merely engages with the valve shaft.

Moreover, since the second body member 19 of the body 16 forming part of the relief valve 22 forms part of the pressure reducing valve, the relief valve 22 can be provided compactly on the pressure reducing valve.

Embodiment 2

Figure 12:
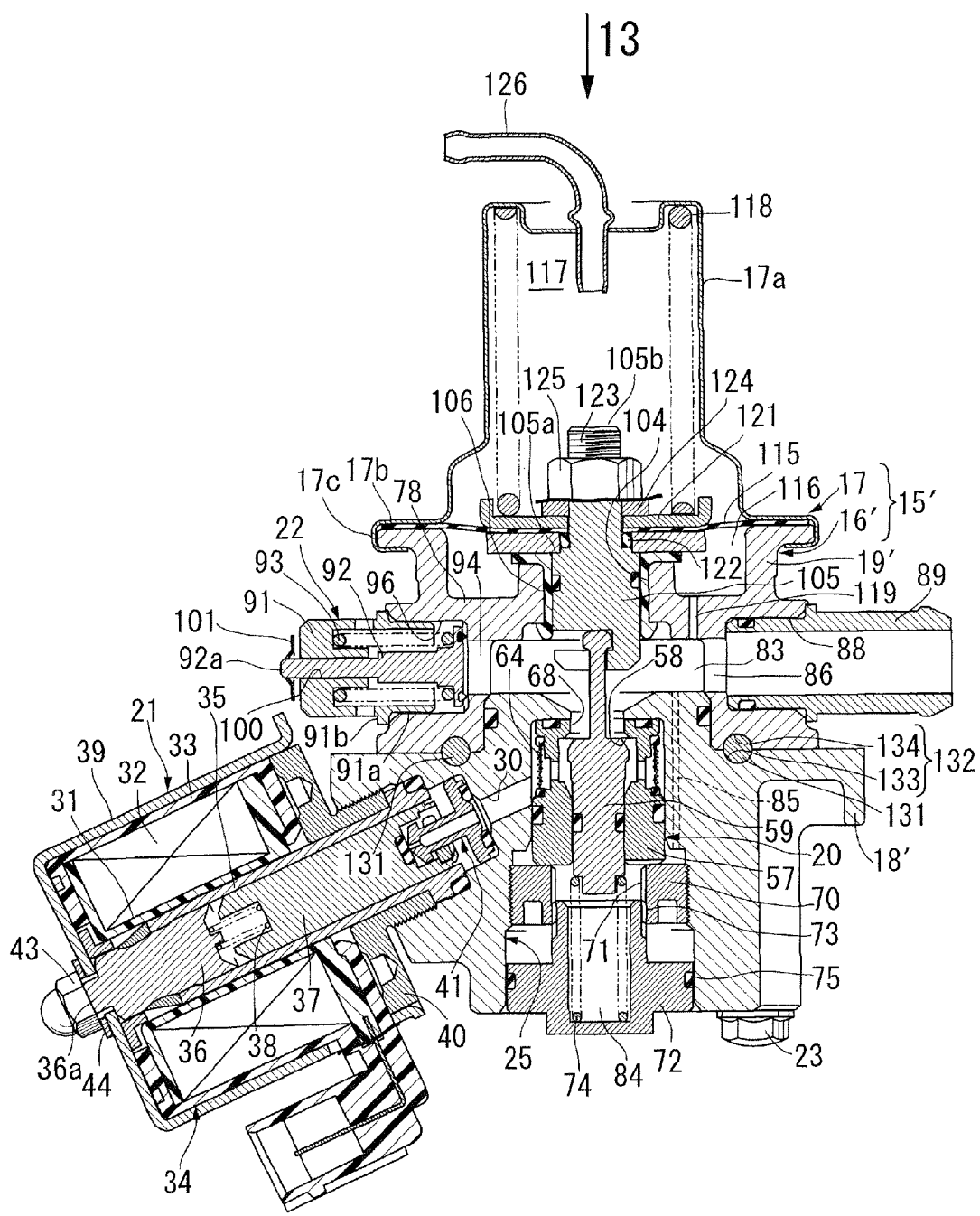
FIG. 12 is a sectional view, corresponding to FIG. 2, of a pressure reducing valve for gas of a second embodiment. (second embodiment)
Figure 13:
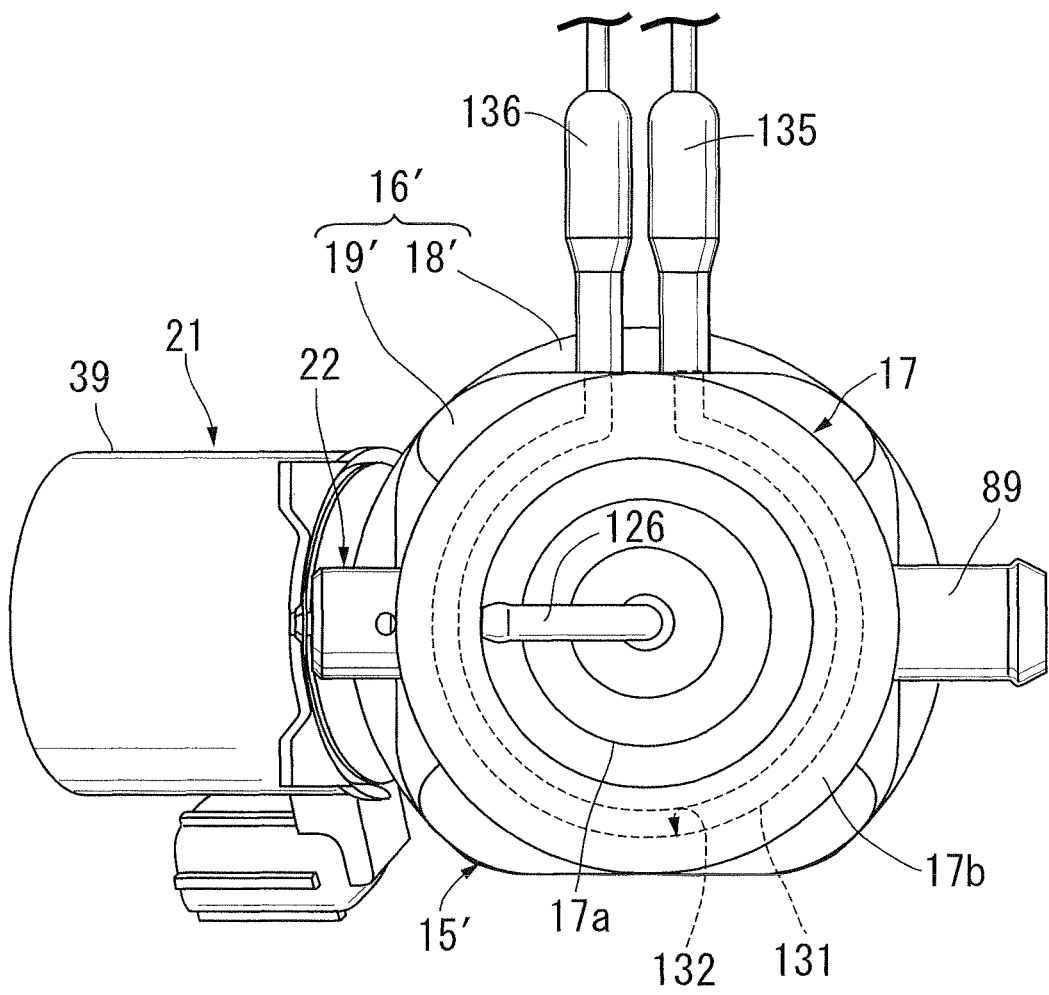
FIG. 13 is a view from arrow 13 in FIG. 12. (second embodiment)

FIG. 12 and FIG. 13 show a second embodiment of the present invention.

First, in FIG. 12, a housing 15' of this pressure reducing valve for gas is formed from a body 16' formed by joining first and second body members 18' and 19' to each other, and a diaphragm cover 17 joined to the body 16', the body 16' housing a valve mechanism 20, and an electromagnetic cut-off valve 21 and a relief valve 22 being disposed in the body 16'.

The body 16' is formed by joining to each other a plurality of body members having different strengths from each other, in this embodiment the first body member 18', which has a high strength, and the second body member 19', which has a low strength, while vertically stacked by means of, for example, four bolts 23, the first body member 18' being formed by, for example, cutting a drawn aluminum alloy or by cutting details after forging an aluminum alloy, and the second body member 19' being formed by, for example, cutting details after casting an aluminum alloy.

Provided on at least one of the joining faces of the first and second body members 18' and 19', which are mutually joined to form the body 16', in this second embodiment both of the joining faces of the first and second body members 18' and 19' are grooves 133 and 134 for forming between the mutually joined first and second body members 18' and 19' a housing chamber 132 for housing an electric heater (sheath heater) 131, which is heating means. Moreover, the first and second body members 18' and 19' are molded, and the grooves 133 and 134 are formed at the same time as molding of the first and second body members 18' and 19'.

Referring in addition to FIG. 13, the housing chamber 132 formed from the grooves 133 and 134 is formed in an arc shape surrounding a valve body 59 and a valve seat 58 when viewed in a direction along the axis of the valve body 59 in a valve mechanism 20 and is disposed at substantially the same position as the valve seat 58 in a direction along the axis of the valve body 59, and connection terminals 135 and 136 connected to opposite ends of the electric heater 131 housed in the housing chamber 132 extend sideways from the body 16'.

In accordance with this second embodiment, the body 16' can freely be heated by the electric heater 131; moreover, it is possible to heat effectively the surroundings of the valve seat 58 and the valve body 59, whose temperatures easily decrease during the pressure reduction action accompanying operation of the valve mechanism 20 and, moreover, due to the housing chamber 132 having an arc shape the surroundings of the valve seat 58 and the valve body 59 can be substantially evenly heated.

Furthermore, since the grooves 133 and 134 forming the housing chamber 132 are formed at the same time as molding of the first and second body members 18' and 19', it is unnecessary to carry out machining for forming the grooves 133 and 134, thus reducing the cost.

Embodiments of the present invention are explained above, but the present invention is not limited to the above embodiments, and may be modified in a variety of ways as long as the modifications do not depart from the present invention described in Claims in the following section onward.

The invention claimed is:

1. A pressure reducing valve for gas in which a valve mechanism (20) having opening in a central part thereof a valve hole (68) that communicates with a low pressure passage (85, 86, 94, 119) and a low pressure chamber (83, 84, 116) and comprising a valve body (59) that is capable of being seated on a valve seat (58) facing a valve chamber (66) communicating with a high pressure passage (27, 28, 30, 64) is housed within a body (16, 16') such that the valve body (59) is connected to a pressure receiving member (115) operating in response to pressure of the low pressure passage (85, 86, 94, 119) and the low pressure chamber (83, 84, 116), characterized in that the body (16, 16') is formed by joining two, that is, first and second body members (18, 19; 18', 19') having different strengths, the body (16, 16') being formed by joining the second body member (19, 19'), which has a low strength, and the first body member (18, 18'), which has a high strength and has an insertion hole (25) coaxially housing the valve mechanism (20), so that the second body member (19, 19') and the first body member (18, 18') overlap each other in a direction along an axis of the valve body (59) while forming therebetween a pressure reduction chamber (83), which is the low pressure chamber, and a circular cross-section fitting projection (18a) projectingly provided integrally with the first body member (18, 18') so as to be coaxial with the insertion hole (25) is hermetically fitted into the second body member (19, 19').

2. The pressure reducing valve for gas according to claim 1, wherein a groove (110, 133, 134) is provided in at least one of joining faces of the plurality of body members (18, 19; 18', 19') that are joined to each other to form the body (16, 16'), the groove (110, 133, 134) forming between the body members (18, 19; 18', 19') that are joined to each other a housing chamber (132) housing heating means (131) or a heating medium passage (109) through which a heating medium flows.

3. A pressure reducing valve for gas in which a valve mechanism (20) having opening in a central part thereof a valve hole (68) that communicates with a low pressure passage (85, 86, 94, 119) and a low pressure chamber (83, 84, 116) and comprising a valve body (59) that is capable of being seated on a valve seat (58) facing a valve chamber (66) communicating with a high pressure passage (27, 28, 30, 64) is housed within a body (16, 16') such that the valve body (59) is connected to a diaphragm (115) operating in response to pressure of the low pressure passage (85, 86, 94, 119) and the low pressure chamber (83, 84, 116),

[1] characterized in that the body (16, 16') is formed by joining two, that is, first and second body members (18, 19; 18', 19'), a groove (110, 133, 134) is provided in at least one of joining faces of the body members (18, 19; 18', 19'), the groove (110, 133, 134) forming between the body members (18, 19; 18', 19') in a state of being joined together a housing chamber (132) for housing heating means (131) or a heating medium passage (109) through which a heating medium flows, the first body member (18, 18') has an insertion hole (25) coaxially housing the valve mechanism (20), a circular cross-section fitting projection (18a) projectingly provided integrally with the first body member (18, 18') so as to be coaxial with the insertion hole (25) is hermetically fitted into a fitting hole (80) of the second body member (19, 19'), the second body member (19, 19') clamps a peripheral edge part of the diaphragm (115) between the second body member (19, 19') and a diaphragm cover (17) so that the diaphragm (115) is positioned coaxially with the fitting hole (80), and the valve body (59) is connected to a central part of the diaphragm (115).

4. The pressure reducing valve for gas according to claim 3, wherein the heating medium passage (109) or the housing chamber (132) is formed in an arc shape surrounding the valve body (59) and the valve seat (58) when viewed in a direction along an axis of the valve body (59).

5. The pressure reducing valve for gas according to claim 3 or 4, wherein the heating medium passage (109) or the housing chamber (132) is disposed at substantially the same position as the valve seat (58) in a direction along an axis of the valve body (59).

6. The pressure reducing valve for gas according to claim 3, wherein the body member (19; 18', 19') having the groove (110, 133, 134) formed therein is molded, and the groove (110, 133, 134) is formed at the same time as said molding.

7. The pressure reducing valve for gas according claim 3, wherein a heating medium that is guided to the heating medium passage (109) is engine cooling water.

8. The pressure reducing valve for gas according to claim 3, wherein the heating means (131) is an electric heater.

* * * * *